United States Patent
Battaia

(10) Patent No.: US 7,024,579 B2
(45) Date of Patent: Apr. 4, 2006

(54) CONFIGURABLE TIMING SYSTEM HAVING A PLURALITY OF TIMING UNITS INTERCONNECTED VIA SOFTWARE PROGRAMMABLE REGISTERS

(75) Inventor: Alberto Battaia, Ispra (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 562 days.

(21) Appl. No.: 10/229,377

(22) Filed: Aug. 27, 2002

(65) Prior Publication Data

US 2004/0044923 A1   Mar. 4, 2004

(51) Int. Cl.
  *G06F 1/04*   (2006.01)

(52) U.S. Cl. .................... 713/500; 326/37; 326/38; 377/54

(58) Field of Classification Search ............... 713/500; 326/37, 38; 377/54
  See application file for complete search history.

(56) References Cited

U.S. PATENT DOCUMENTS

| | | | | |
|---|---|---|---|---|
| 4,001,699 | A | * | 1/1977 | Denny et al. .................. 345/35 |
| 4,757,522 | A | * | 7/1988 | Kieselstein .................... 377/26 |
| 5,036,489 | A | * | 7/1991 | Theobald ...................... 365/73 |
| 5,634,045 | A | | 5/1997 | Goler et al. ................ 395/559 |
| 6,152,367 | A | * | 11/2000 | Kowalski ..................... 235/382 |
| 6,356,615 | B1 | * | 3/2002 | Coon et al. .................... 377/16 |
| 6,457,081 | B1 | * | 9/2002 | Gulick ........................ 710/305 |

FOREIGN PATENT DOCUMENTS

| | | |
|---|---|---|
| EP | 0 355 363 | 2/1990 |
| EP | 0 773 491 | 11/1995 |

\* cited by examiner

*Primary Examiner*—Lynne H. Browne
*Assistant Examiner*—Anand B. Patel
(74) *Attorney, Agent, or Firm*—Lisa K. Jorgenson; Allen, Dyer, Doppelt, Milbrath & Gilchrist, P.A.

(57) ABSTRACT

The timing system includes a plurality of timing units interconnected to perform a count operation. Software programmable registers interconnect the plurality of timing units, and a control circuit generates a clock signal for the plurality of timing units. The control circuit includes an interface for connection to an external bus to receive and transmit data.

28 Claims, 29 Drawing Sheets

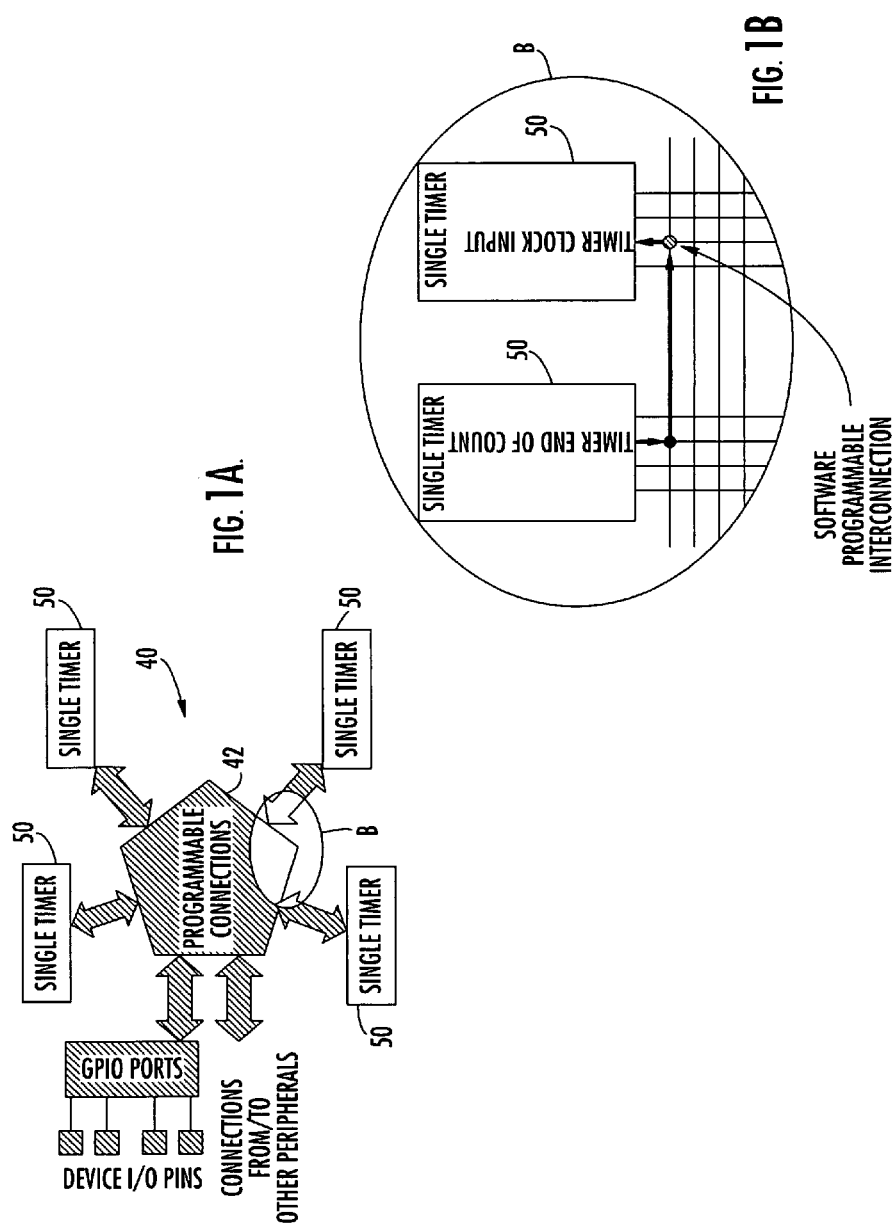

CONFIGURABLE TIMING SYSTEM HAVING A PLURALITY OF TIMING UNITS INTERCONNECTED VIA SOFTWARE PROGRAMMABLE REGISTERS

FIELD OF THE INVENTION

The present invention relates in general to timing circuits, and, more particularly, to a timing system having a plurality of timing units interconnected via software configurable registers.

BACKGROUND OF THE INVENTION

Timing systems for microcomputers are well known in the art. They are particularly used in the field of digital devices for cars, for carrying out complex timing functions, such as event counting in a timing window, or for having different timing functions with different resolution. To perform these functions, timing units (which have standard characteristics) are connected among them in different ways to form a timing system. For instance, if only 16 bit timing units are available (that may count up to 65,535) and the events to be counted are more numerous than 65,535, two or more timing units may be connected such that the end count pulse of a first timing unit is sent to a second timing unit. These connections may be done via software, hardware or a combination thereof.

The software connection includes a routine installed in the microprocessor that uses the timing system. The microprocessor receives the count signals for its calculations and signals produced by each timing unit, recognizes the nature thereof (if it is an end count signal or another kind of signal), and sends it to a certain input of another timing unit. It is evident that with this technique, it is possible to change the interactions among timing units at any time, thus using the same timing units for many different functions. On the other hand, the microprocessor is overloaded, because it must intervene each time a timing unit generates a signal to be input to another timing unit.

The hardware approach includes connecting the timing units of the timing system in a fixed manner. This approach allows fast computations and it does not overload the microprocessor, but the chosen configuration cannot be modified, thus it is not possible to reuse the same timing units for many different purposes.

Mixed approaches include using a dedicated coprocessor only for managing all interactions among timing units, is disclosed in the European Patent Application EP 355, 363 by B. F. Wilkie et al. This approach does not burden the microprocessor and ensures a complete flexibility of use of timing units, which can be reconfigured and reused for other applications. Unfortunately, the realization of the dedicated coprocessor is costly in terms of the amount of silicon area occupied.

A different approach, disclosed in U.S. Pat. No. 5,634,045 and EP 773, 491 by V. B. Goler et al., contemplates using software configurable structures having channels that communicate by way of independently partitioned timer buses and pin/status buses. Unfortunately these structures are complex to be managed.

SUMMARY OF THE INVENTION

It is an object of the present invention to provide a Configurable Timing System (CTS) that is not affected by the above mentioned drawbacks.

Drawbacks of prior art timing systems are overcome by forming a CTS interconnecting the timing units with software programmable registers that can be programmed to connect or disconnect a connection between inputs or outputs of the timing units of the CTS. Therefore, the architecture of the CTS of the invention is preferably the same for each application, and the interconnections among the timing units may be formed at any time via software depending on the required application. Moreover, a CTS of the invention may be reused for other applications simply by reprogramming the registers, thus connecting the timing units in a different way.

More precisely, a timing system of the present invention includes N timing units interconnected to perform a certain count operation, a control circuit generating at least one clock signal for the timing units, and an interface for the control circuit adjacent an external bus for receiving and transmitting data. The timing system of the invention may be programmed via software and be used in many different applications because the timing units are interconnected by software programmable registers.

According to another innovative aspect of the invention, the timing system has two distinct orders of parallel lines crossing each other. The first and the second orders of parallel lines comprise groups of parallel lines. Each group includes a number of lines equivalent to the number of inputs and outputs, respectively, of the respective timing unit to which they are connected. This structure of the CTS of the invention is particularly convenient because it makes interconnections among timing units possible by disposing software programmable registers at crossing points between the lines of groups belonging to the first and the second order, respectively.

Another aspect of the invention is a timing unit to be interconnected with other timing units to form a configurable timing system as described above.

BRIEF DESCRIPTION OF THE DRAWINGS

The different aspects and advantages of the invention will appear even more evident through a detailed description referring to the attached drawings wherein:

FIGS. 1A and 1B are schematic diagrams illustrating the basic interconnections of timing units of a configurable timing system in accordance with the invention;

DETAILED DESCRIPTION OF THE PREFERRED EMBODIMENTS

FIGS. 1A and 1B depict the basic connections among four timing units 50 of a Configurable Timing System (CTS) 40 of the invention and a way to connect two timing units for increasing the maximum number of pulses that may be counted. The CTS 40 of the invention has input and output pins (which are not necessarily proportional to the number of timing units) and lines for communicating with external peripherals (for instance another set of timing units, an analog/digital converter, etc.).

Figure 2A:
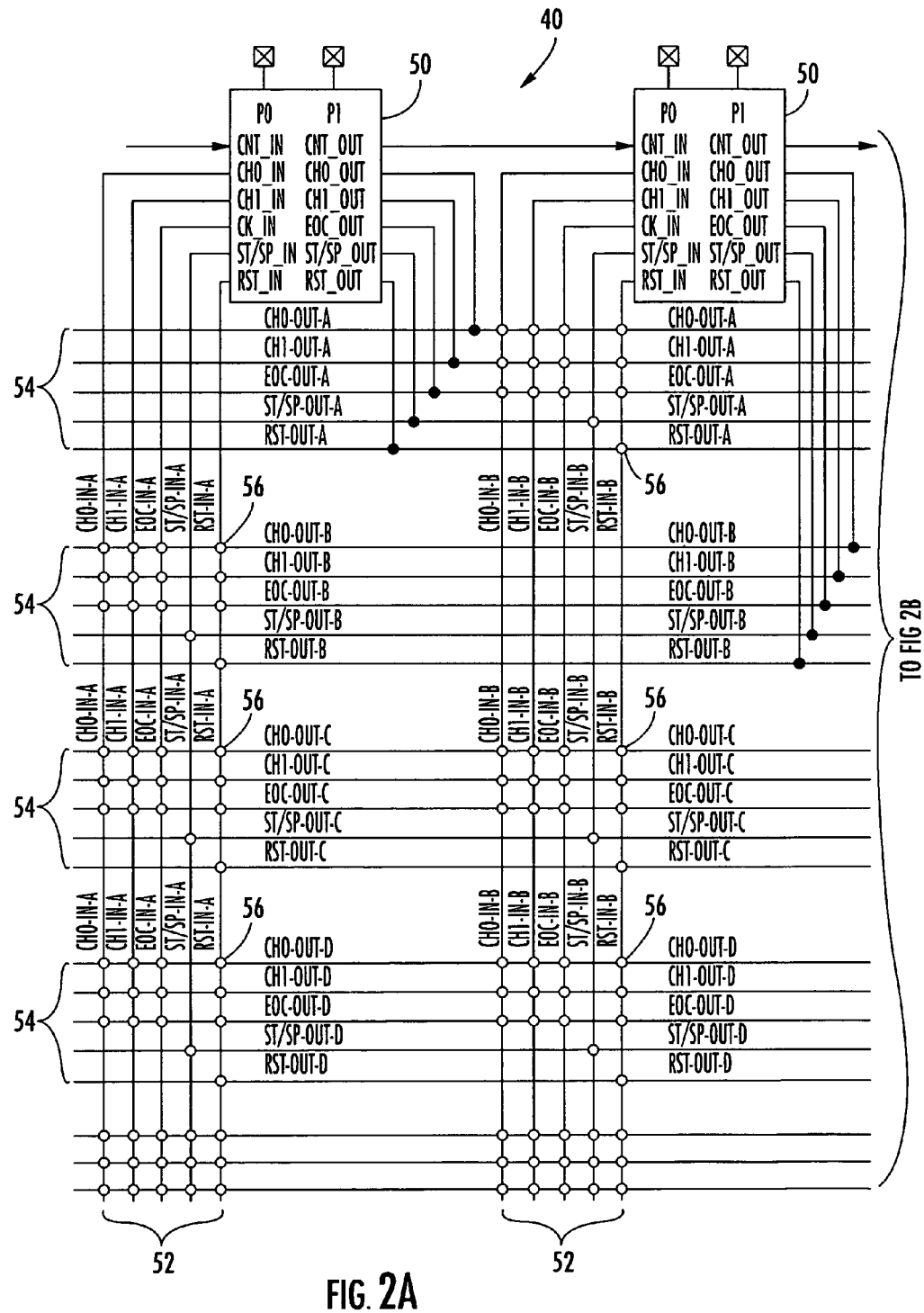
FIG. 2 is a schematic diagram illustrating an interconnection scheme of four timing units of a configurable timing system of the invention.
Figure 2B:
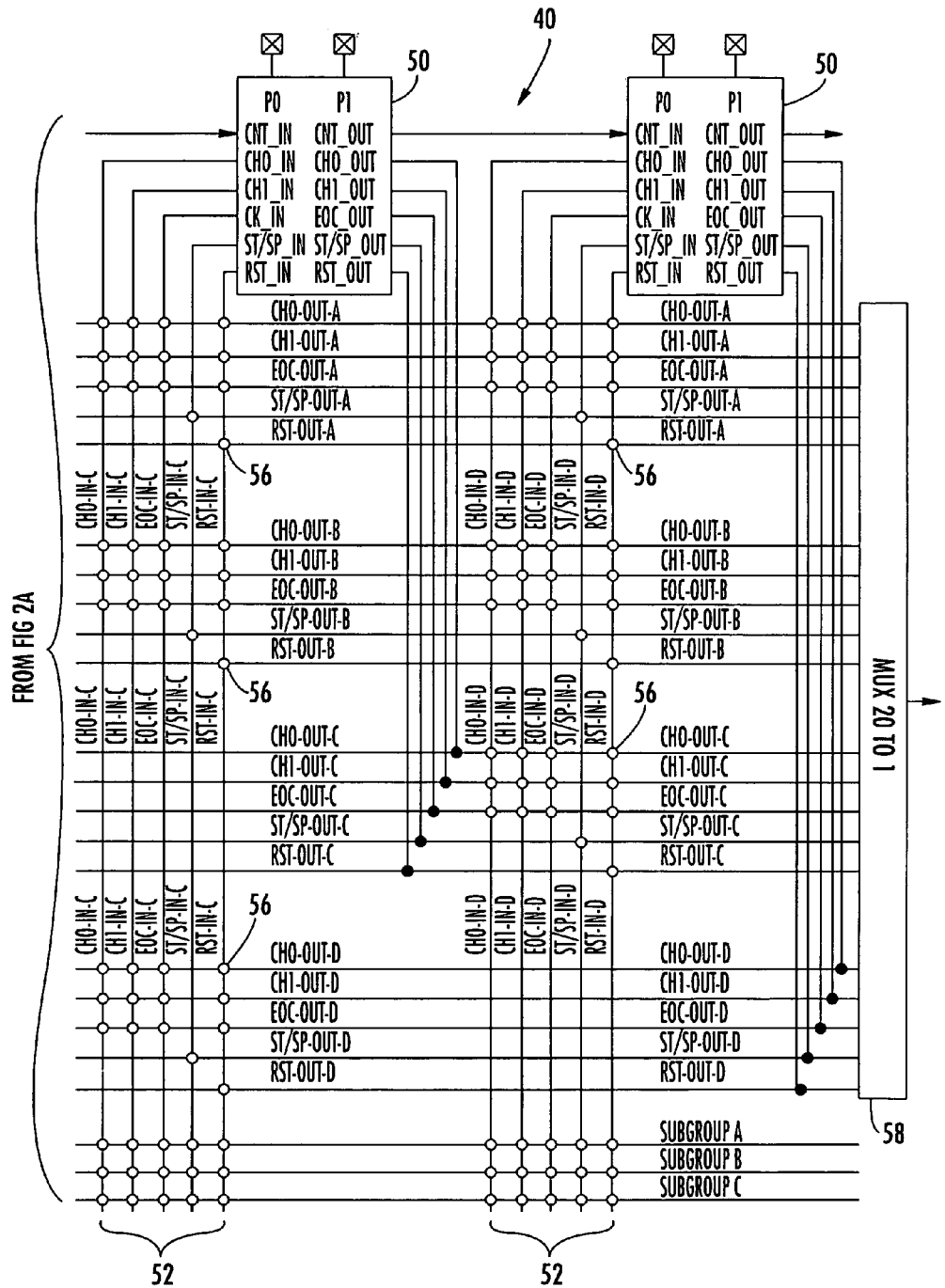

A detail of a preferred embodiment of the CTS 40 of the invention is illustrated in FIG. 2. The timing units 50 are interconnected through two orders of parallel lines 52, 54 each subdivided in a number of subgroups of parallel lines equal to the number of timing units. Each input of a timing unit is hardwired to a line of a subgroup 52 of the first order, and each output of a timing unit is hardwired to a line of a respective subgroup 54 of the second order. On the crossing points of lines of different orders there are programmable registers (indicated with a white circle) 56, that may be programmed to connect or disconnect an input of a timing unit 50 and an output of another timing unit. A multiplexer 58 is used for selecting lines for communicating with external peripherals (for instance another set of timing units, an analog/digital converter, etc.).

Figure 3:
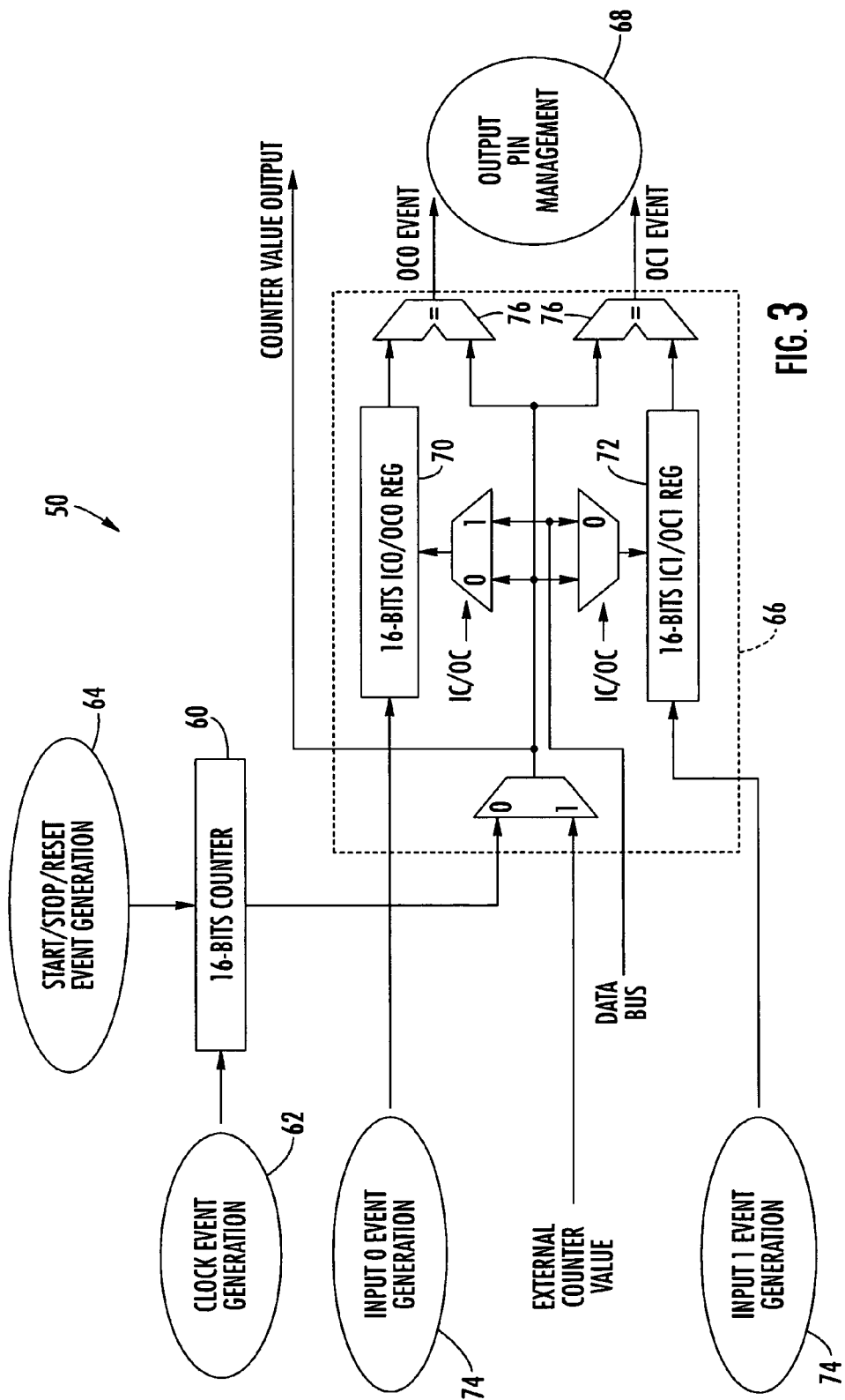
FIG. 3 is a schematic diagram illustrating the structure of a timing unit of the invention.

Of course, timing units 50 are designed to receive signals from other timing units, from a pin of the CTS or from other peripherals, and to output signals toward other timing units or toward the pin of the CTS and other peripherals. FIG. 3 depicts a general architecture of a timing unit 50 of the invention especially designed to satisfy these requisites. The timing unit 50 of FIG. 3 has, like many known timing units, a counter 60, a first circuit or first circuit means 62 generating pulses to be counted by the counter, a second circuit or second circuit means 64 generating start, stop and reset commands for the counter, a third circuit or third circuit means 66 coupled to the counter and to the data bus for generating a digital signal, and an output stage 68 receiving the digital signal and outputting it on at least an input/output pin of the timing unit.

The peculiarity of the timing unit 50 of FIG. 3 is that it has a first capture and compare register 70 and a second capture and compare register 72 coupled to the data bus, that are destined to store the number of counted events or other values such as the period and the duty cycle of a PWM signal to be generated. In other embodiments, just one register or more than two registers may be present. Also, a fourth circuit or fourth circuit means 74 generate enabling signals for loading values in the capture and compare registers 70, 72, and a pair of comparators 76 each compare the value of a respective capture and compare register with the value of the counter or an external counter value provided to the timing unit, and generate respective first and second comparison signals. A logic circuit 78 (FIG. 4) generates a digital signal from the comparison signals.

The output stage 68 or OUTPUT PIN MANAGEMENT is used to generate digital signals, i.e. an active (0) or inactive (1) logic signal, pulses or PWM signals on one or both the pins (in phase or 180° shifted), on the input/output pins P0 and P1 (when available) according to the selected function and the signals OC0_EVENT and OC1_EVENT.

Figure 4:
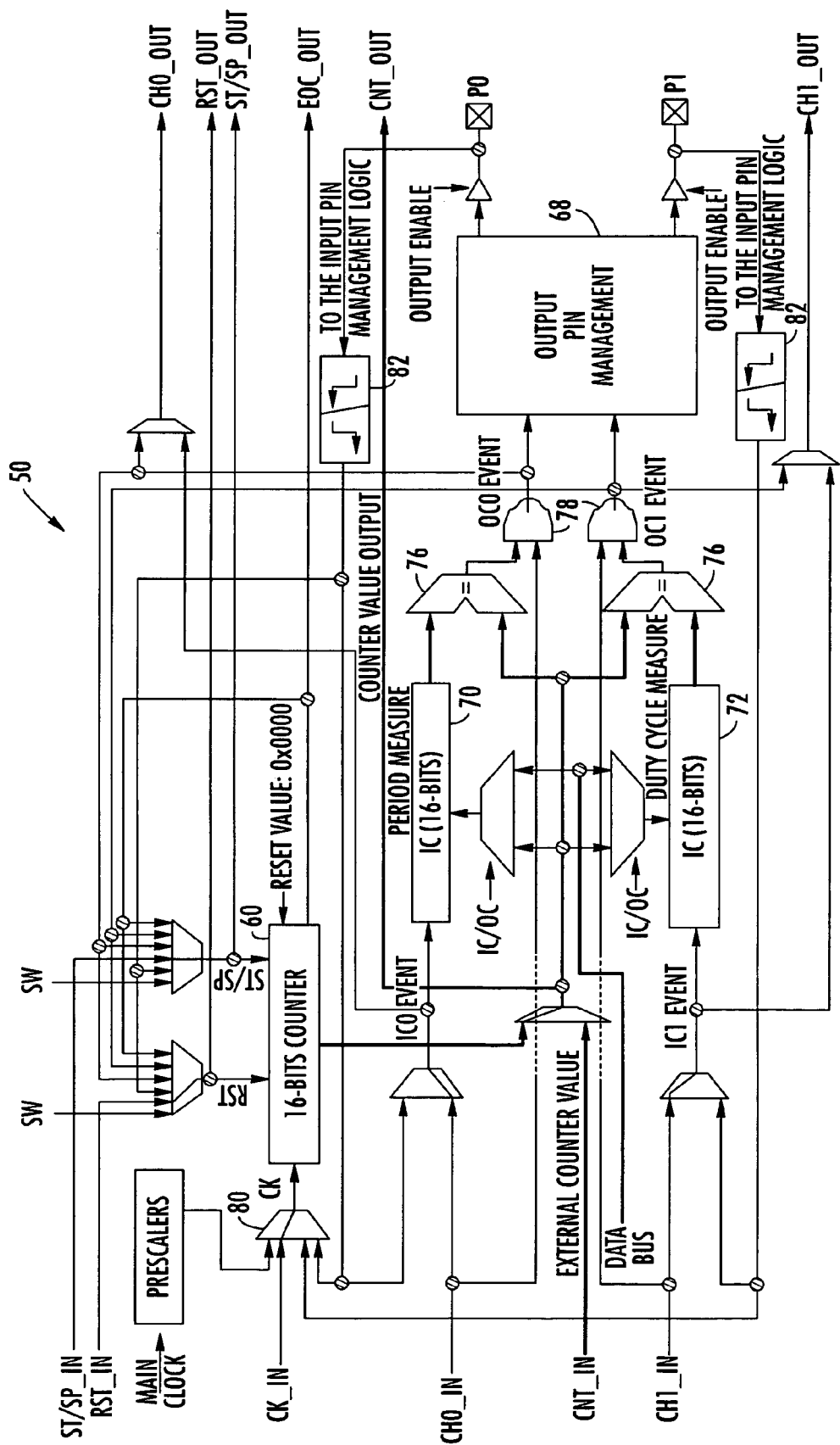
FIG. 4 is a schematic diagram illustrating in detail the structure of a timing unit of the invention.

A detailed view of a preferred embodiment of the timing unit of the invention is depicted in FIG. 4. In the cited figure there are two arrows originating from the pins P0 and P1 representing lines of a digital signal applied on these pins to carry out measurements of timing characteristics thereof. This optional feature of the timing unit of the invention will be described in detail hereinafter.

The inputs of the timing units 50 are: the capture inputs CH0_IN and CH1_IN; the count pulse input CK_IN; the reset input RST_IN and the start/stop count input ST/SP_IN; the input pins of the value of another timing unit CNT_IN. The output signals are: the output compare signals CH0_OUT and CH1_OUT; the end count signal EOC_OUT;

the reset signal RST_OUT and the start count or the stop count signal ST/SP_OUT; the signal representing the value of the timing unit CNT_OUT.

In the ensuing description the case in which the start/stop signals are associated to the same input or output line is considered, but it is clear that the invention is applicable even with timing units in which the start and stop signals are associated to distinct input or output lines. The timing unit 50 of FIG. 4 may count both the pulses on the count pulse input CK_IN as well as the pulses of a system clock signal. The block PRESCALERS is a frequency divider that is input with the system clock signal (which is at high frequency, for instance at 40 MHz) and generates a low frequency local clock signal (for instance at 1MHz or also at 100 kHz). In this way, it is possible to let the timing units 50 of a timing system operate with different clocks having only one clock generator for the whole system.

The counter 60 counts the pulses of the signal CK, which is generated by a multiplexer 80 input with the low frequency clock signal generated by either the block PRESCALERS or by the signal CK_IN or the signals coming from the input/output pins. The value of the block PRESCALERS is the value by which the high frequency system clock must be divided to generate the low frequency local clock signal. The count may be reset, started or stopped via commands RST and ST/SP, which may be forced active by a command SW provided by a control circuit of the timing unit or by the reset, start/stop inputs of the timing unit 50.

The capture and compare registers 72 store values to be compared with the number of pulses counted by the internal counter or the number provided on the input pins CNT_IN. These values are provided through an external data bus DATA BUS, to which the timing unit 50 is coupled, or also through the input pins CNT_IN, depending on the logic state of a binary signal IC/OC, and are stored in the registers 72 when the respective enabling signals IC0_EVENT and IC1_EVENT are active. The comparators 76 output comparison signals OC0_EVENT and OC1_EVENT when the number of events counted by the internal counter or input through the bus CNT_IN is equal to the value stored in the respective register 72. A pair of AND gates 78 generate active signals when the respective input capture signal and comparison signal are active, and input it to the OUTPUT PIN MANAGEMENT section 68 that conditions and transfers the signals to the input/output pins P0 and P1 of the timing unit 50.

The timing unit 50 of FIG. 4 has a pair of edge selection circuits 82 each coupled to a respective input/output pin, generating pulses on the trailing or the falling edges of a digital signal input on the respective input/output pin P0 or P1. The pulse generated by the edge selection circuit 82 connected to the pin P0 may be counted by the internal counter. In this way the timing unit 50 of the invention is capable of performing measurements of timing characteristics of digital input signals, such as duty cycle or period measurements of PWM signals.

Of course, a CTS 40 may include any number of timing units 50, but considerations of design optimization suggest that it is not preferable to realize CTSs with less than four and more than sixteen timing units. Preferably, the timing units 50 are organized in a hierarchical structure to reduce configuration and management complexity. For instance, a CTS 40 of the invention may have sixteen timing units 50 organized in four subgroups of four timing units. All the inputs and outputs of the timing units of a same subgroup are connectable among them by way of programmable registers 56, but timing units belonging to two different subgroups may exchange only a reduced number of signals. The timing units 50 of the sample subgroup of FIG. 2 may exchange only three signals with timing units of another subgroup, through the three lines SUBGROUP_A, SUBGROUP_B and SUBGROUP_C.

Looking at the embodiment represented in FIG. 2, each line at the bottom of the figure is coming from one of the other subgroups. At the same time, the multiplexer 58 on the right side of the figure is used to select one line to be connected to the other subgroups. It is possible to realize configurable timing systems 40 of the invention in which the any number of interconnection lines between subgroups.

Figure 5:
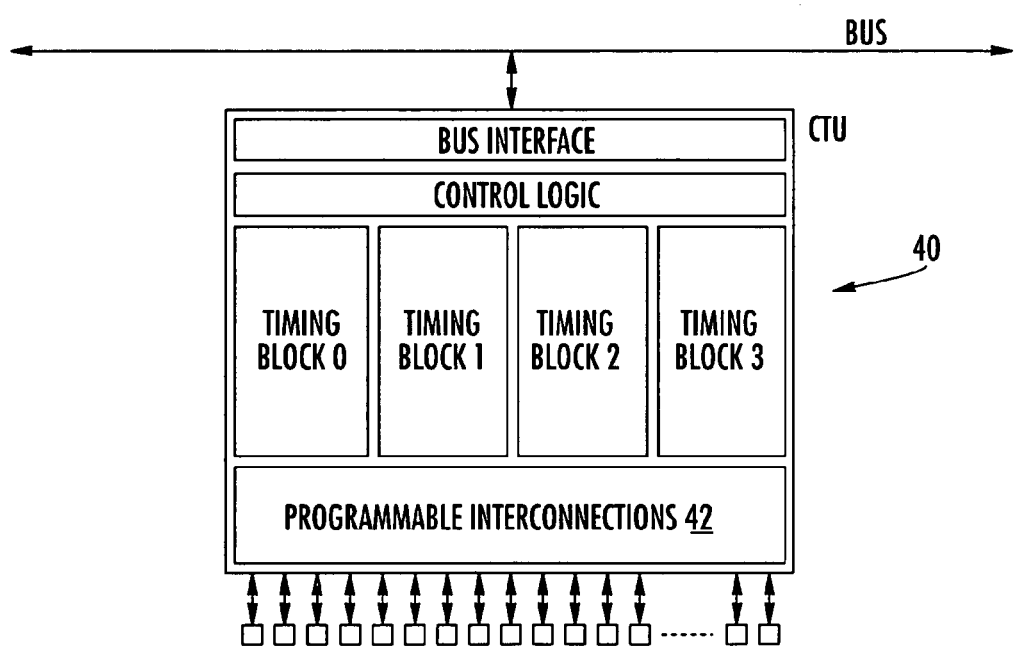
FIG. 5 is a schematic diagram illustrating the basic structure of a configurable timing system of the invention.

A sample realization of a CTS 40 of the invention having timing units organized in subgroups is depicted in FIG. 5. Each subgroup TIMING BLOCK is composed of a certain number of timing units 50, for instance four, that may operate in stand-alone mode or connected to other timing units by software programmable registers schematically represented with the block Programmable Interconnections 42. The CTS 40 also comprises a control circuit CONTROL LOGIC that generates the clock signal Main Clock, the command SW and other control signals for the timing units 50, and an interface BUS INTERFACE for exchanging signals with an external bus.

It is noted that the connections among timing units may be changed at any time via software, thus a same CTS may be easily reconfigured and reused for carrying out other functions simply by re-programming its software programmable registers. Another advantage of the CTS of the present invention is that a same CTS with non-programmed registers may be configured for many different applications. In fact the registers are programmed via software according to the need of the customer in the last step of fabrication. This simplifies the design of the CTS, the number of masks for realizing it and the standardization of functionality tests.

The timing unit 50 of FIG. 4 may perform many different functions in stand alone mode or interconnected with other similar timing units. Examples of the different functions will be described with reference to FIGS. 6–28.

Figure 6:
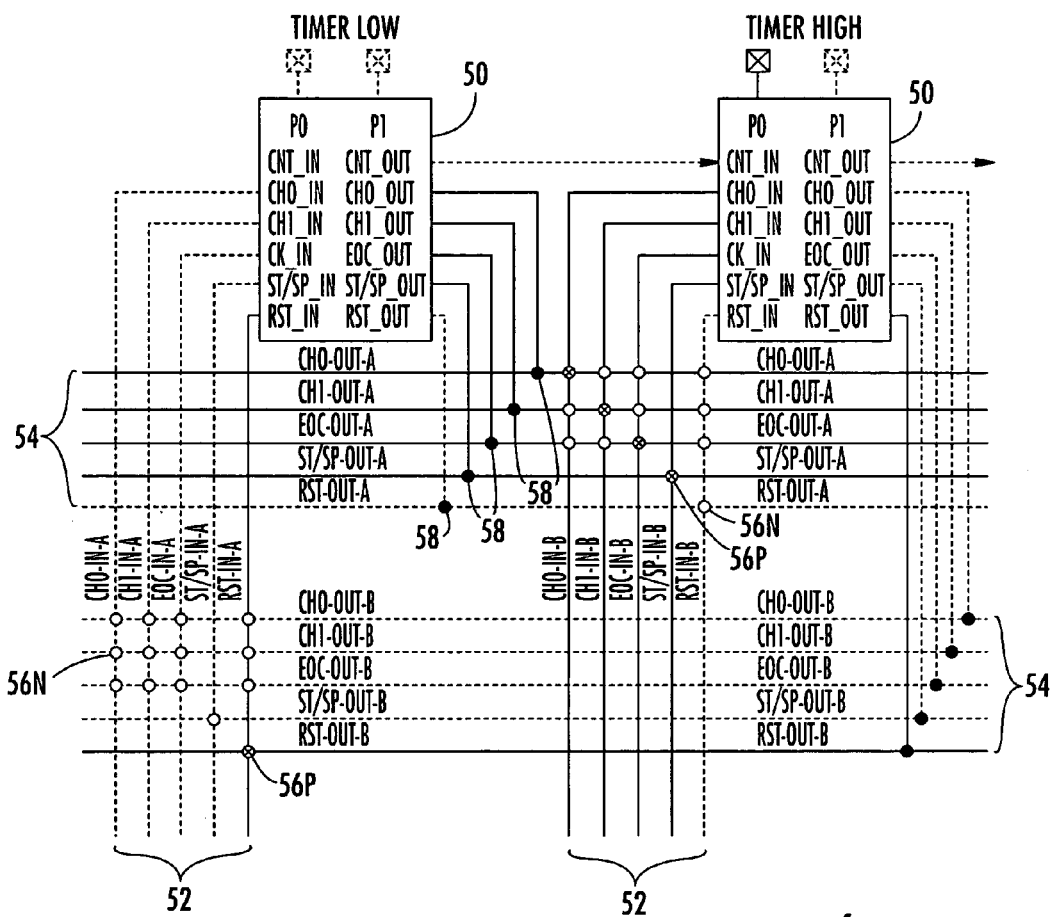
FIG. 6 is a schematic diagram illustrating the interconnections of two timing units of FIG. 4 for realizing a configurable timing system of the invention generating a 32 bit PWM signal.
Figure 7:
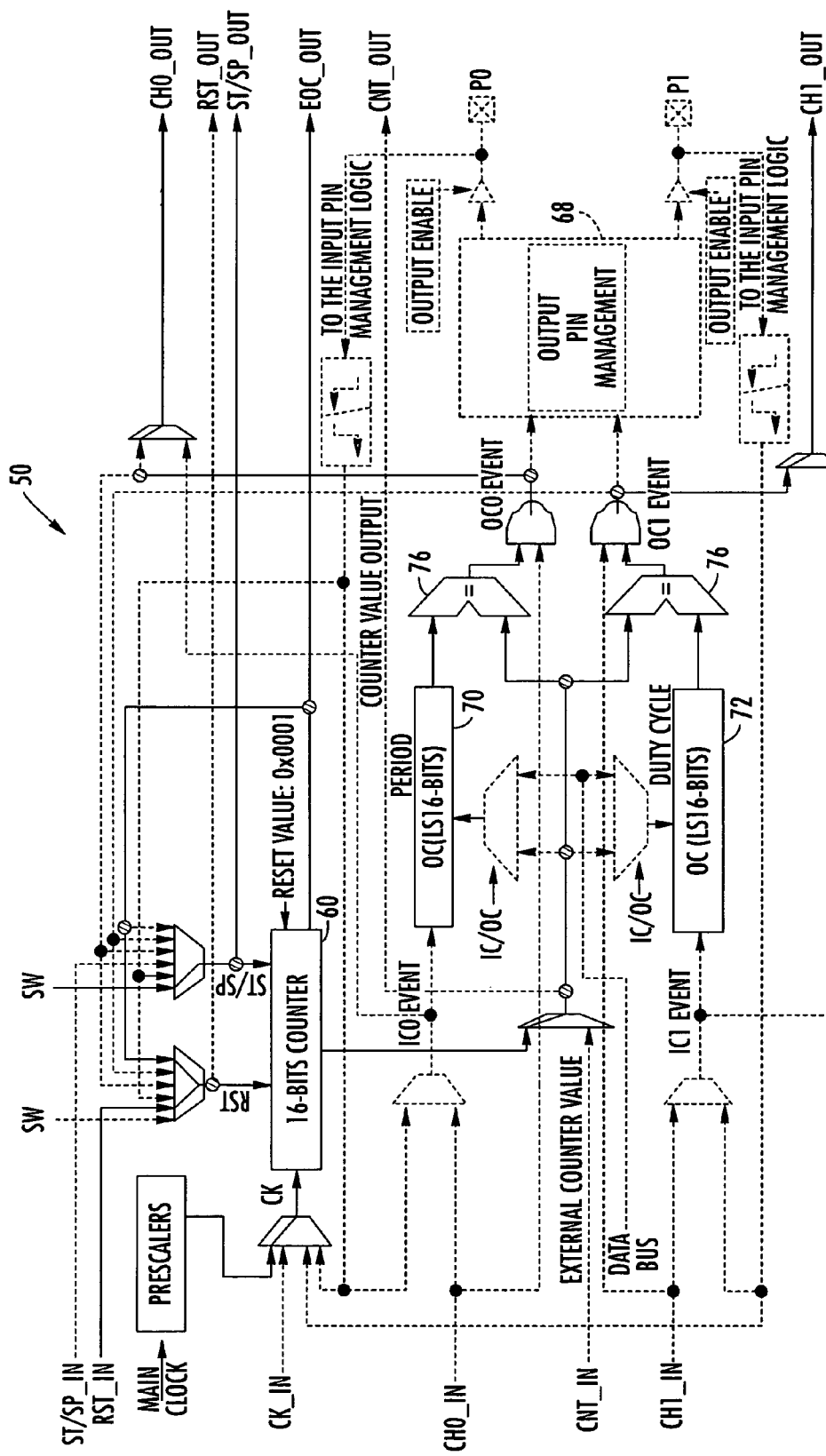
FIG. 7 is a schematic diagram illustrating in detail the circuit blocks effectively used of the timing unit TIMER Low of FIG. 6.
Figure 8:
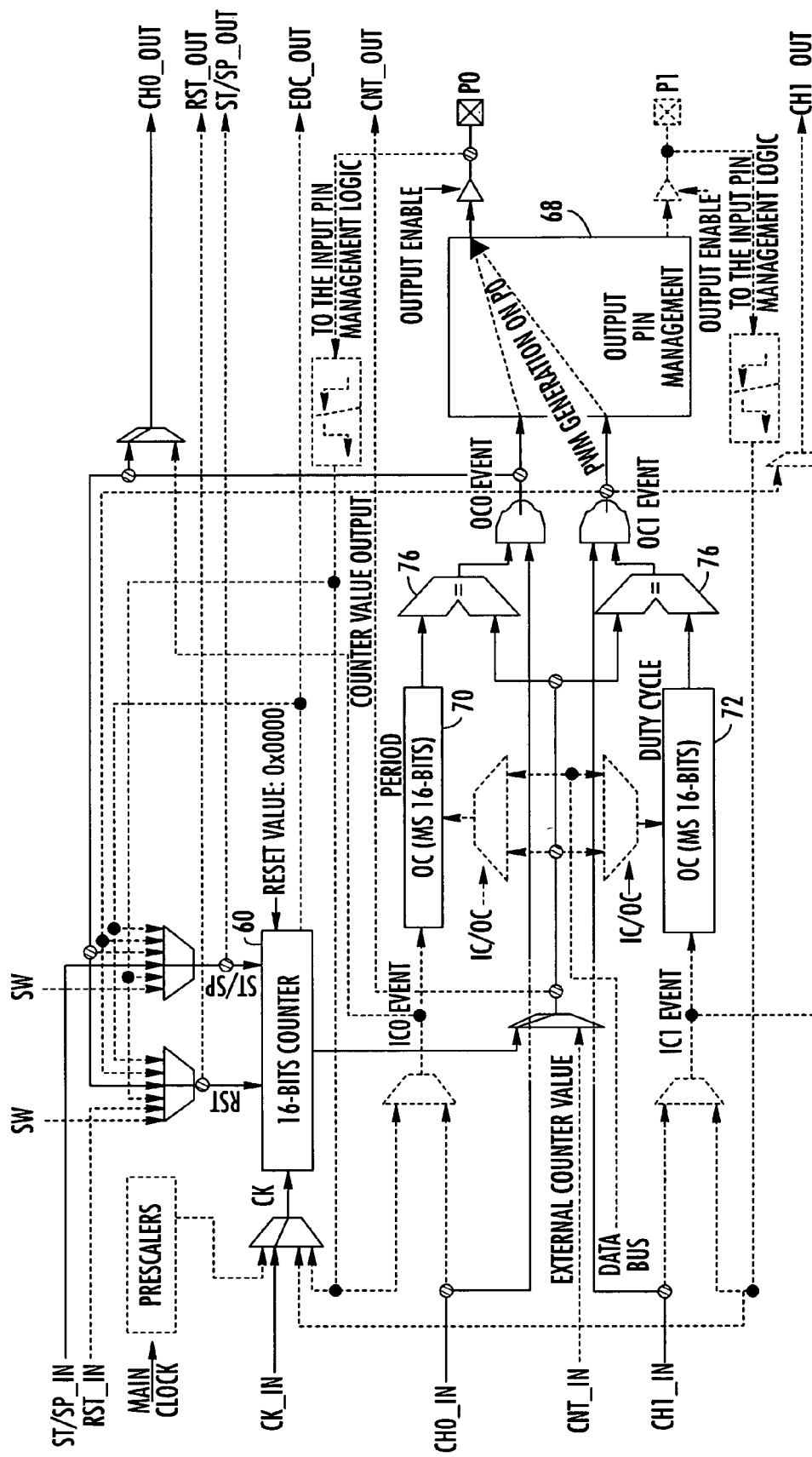
FIG. 8 is a schematic diagram illustrating in detail the circuit blocks effectively used of the timing unit TIMER HIGH of FIG. 6.

For example, the CTS 40 of the invention needs to generate a 32 bit PWM signal but there are only two 16 bit timing units 50, each with two capture and compare registers 70, 72. The timing unit TIMER Low compares the 16 least significant bits of the period and duty cycle of the PWM signal and the timing unit TIMER HIGH compares the relative 16 most significant bits and outputs the 32 bit PWM signal on the pin P0. To obtain this PWM signal, it is necessary to connect the timing units as depicted in FIG. 6, wherein the solid black circles indicate fixed connections (hardwirings) 58, the X circles indicate software programmed connections via programmable registers 56P and the non-X circles indicate non-programmed registers 56N.

The solid lines indicate lines 52, 54 that are effectively used in this example, while the dashed lines indicate lines that are not used. Similarly, in FIGS. 7 and 8 the circuit blocks of the timing units TIMER Low and TIMER HIGH, respectively, that are effectively used are depicted with solid lines, while the non-used blocks are depicted with dashed lines.

The end count signal EOC_OUT of the timing unit TIMER Low is connected to the input CK_IN of the timing unit TIMER HIGH by the programmed register on the crossing point between the lines EOC_OUT_A and EOC_IN_B. Therefore, at each end count event of the TIMER Low, the timing unit Timer High is increased by 1 (thus the count has been extended from 16 to 32 bits). The start/stop output of the timing unit TIMER Low is connected to the respective input ST/SP_IN of the timing unit TIMER HIGH and the reset input of the first timing unit TIMER Low is connected to the reset output RST_OUT of the second timing unit TIMER HIGH. In this way the two timing units are started and stopped by a control circuit of the CTS only providing the command SW to the timing unit TIMER Low.

The capture and compare registers 70, 72 of the timing unit TIMER Low contain the least significant bits of the period and of the duty cycle of the PWM signal to be generated. The registers on the crossing points of the lines CH0_OUT_A and CH0_IN_B, and of the lines CH1_OUT_A and CH1_IN_B are programmed so that the timing unit TIMER Low outputs the compare signals CH0_OUT and CH1_OUT toward the capture inputs of the timing unit TIMER HIGH.

When an output compare signal CH0_OUT or CH1_OUT is asserted, the number of counted pulses of the internal clock signal MAIN CLOCK is equal to the least significant bits of the period or the duty cycle, respectively, of the PWM signal to be generated. The second timing unit TIMER HIGH counts the end count pulses (on the pin EOC_OUT) output by the first timing unit and compares the number of counted pulses with the number stored in its capture and compare registers, representing the most significant bits of the period and of the duty cycle of the PWM signal to be generated. When the number of counted pulses is equal to the number corresponding to the most significant bits of the period or of the duty cycle, the relative comparator 76 generates an active logic signal. If at the same time the respective input capture signal CH0_IN or CH1_IN is also asserted, the AND gates 78 generate a signal fed to the OUTPUT PIN MANAGEMENT section 68, that generates the desired PWM signal on the output pin P0. Of course these configurations may be easily extended to generate 32, 48, or greater bit PWM signals using 16 bit timing units.

Figure 9:
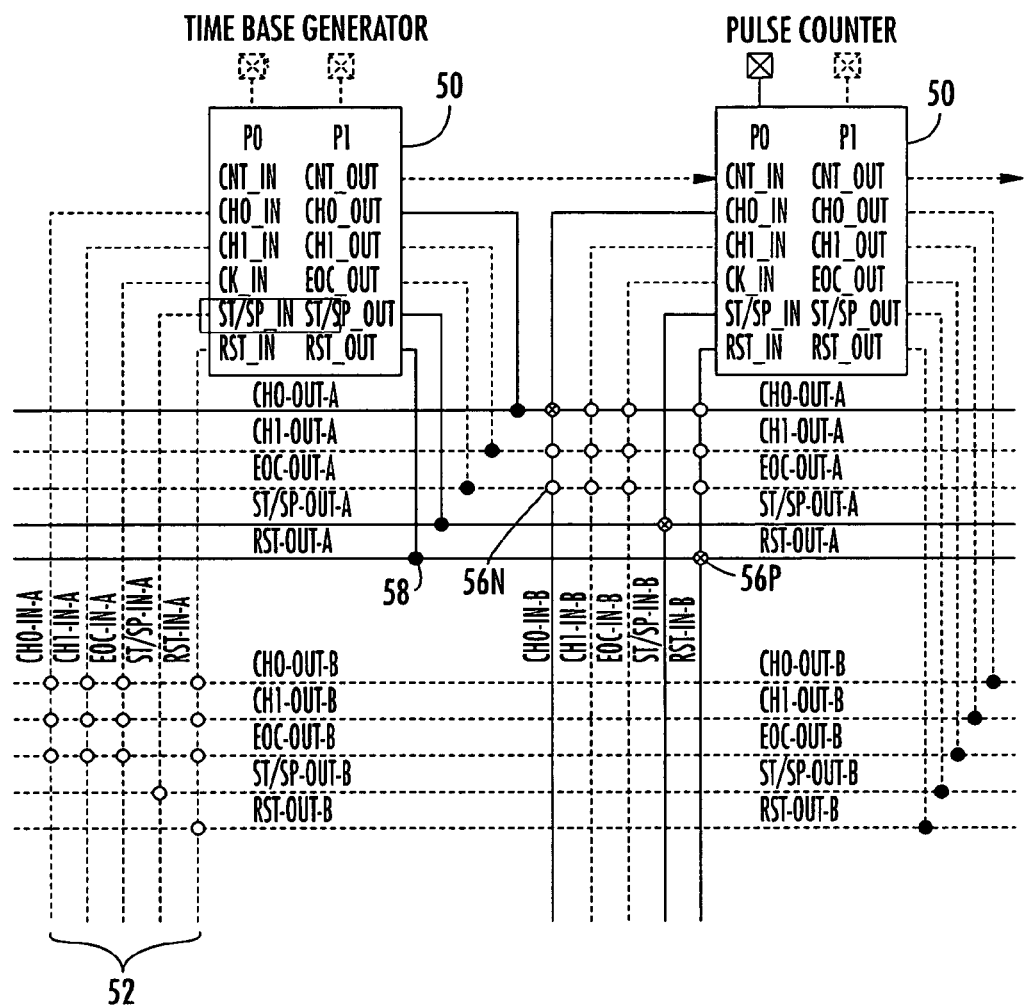
FIG. 9 is a schematic diagram illustrating the interconnections of two timing units of FIG. 4 of a configurable timing system of the invention operating as a continuous pulse accumulator for counting external pulses during a defined time window.
Figure 10:
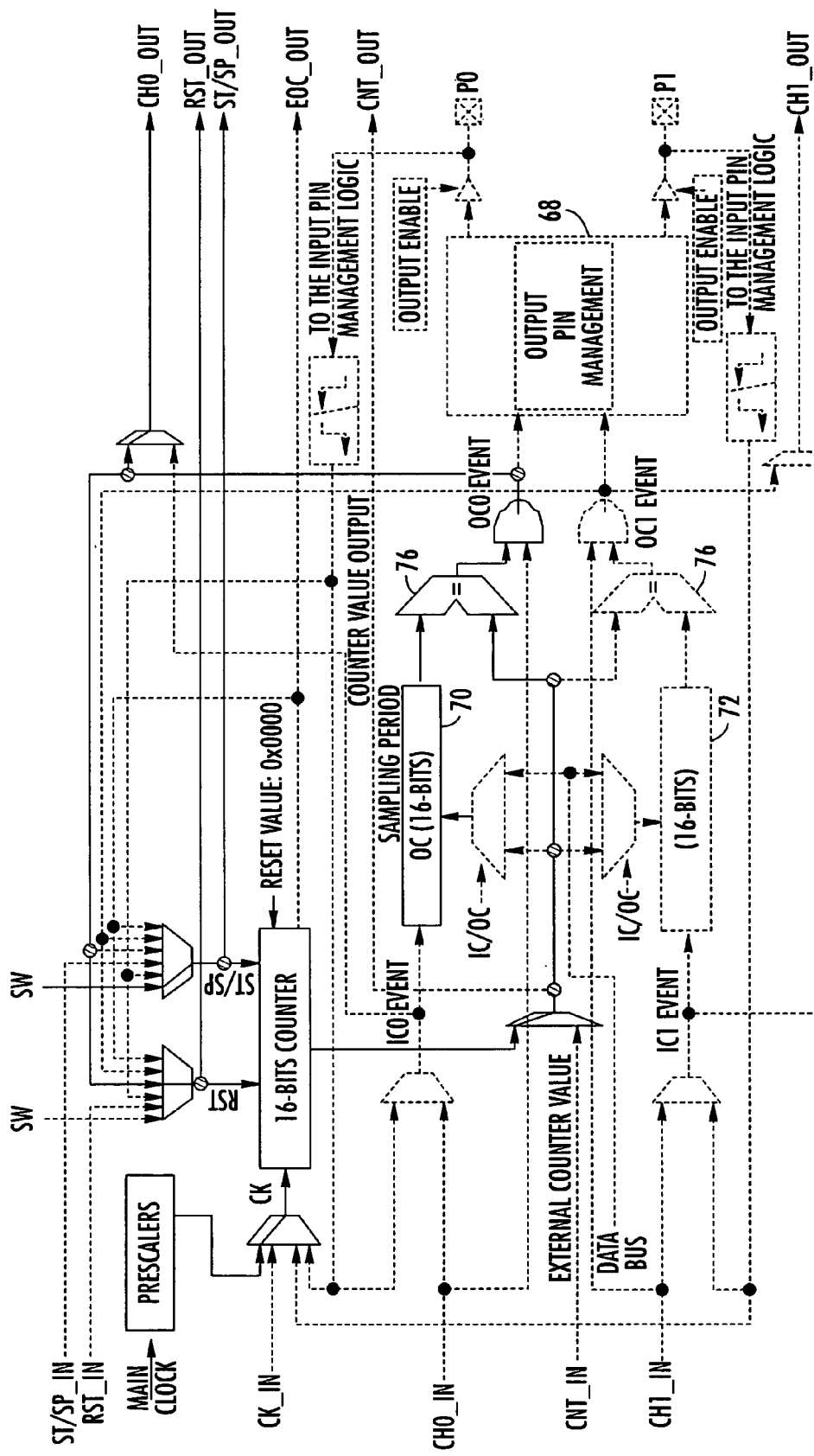
FIGS. 10 and 11 are schematic diagrams illustrating in detail the circuit blocks effectively used of the timing units of FIG. 9.
Figure 11:
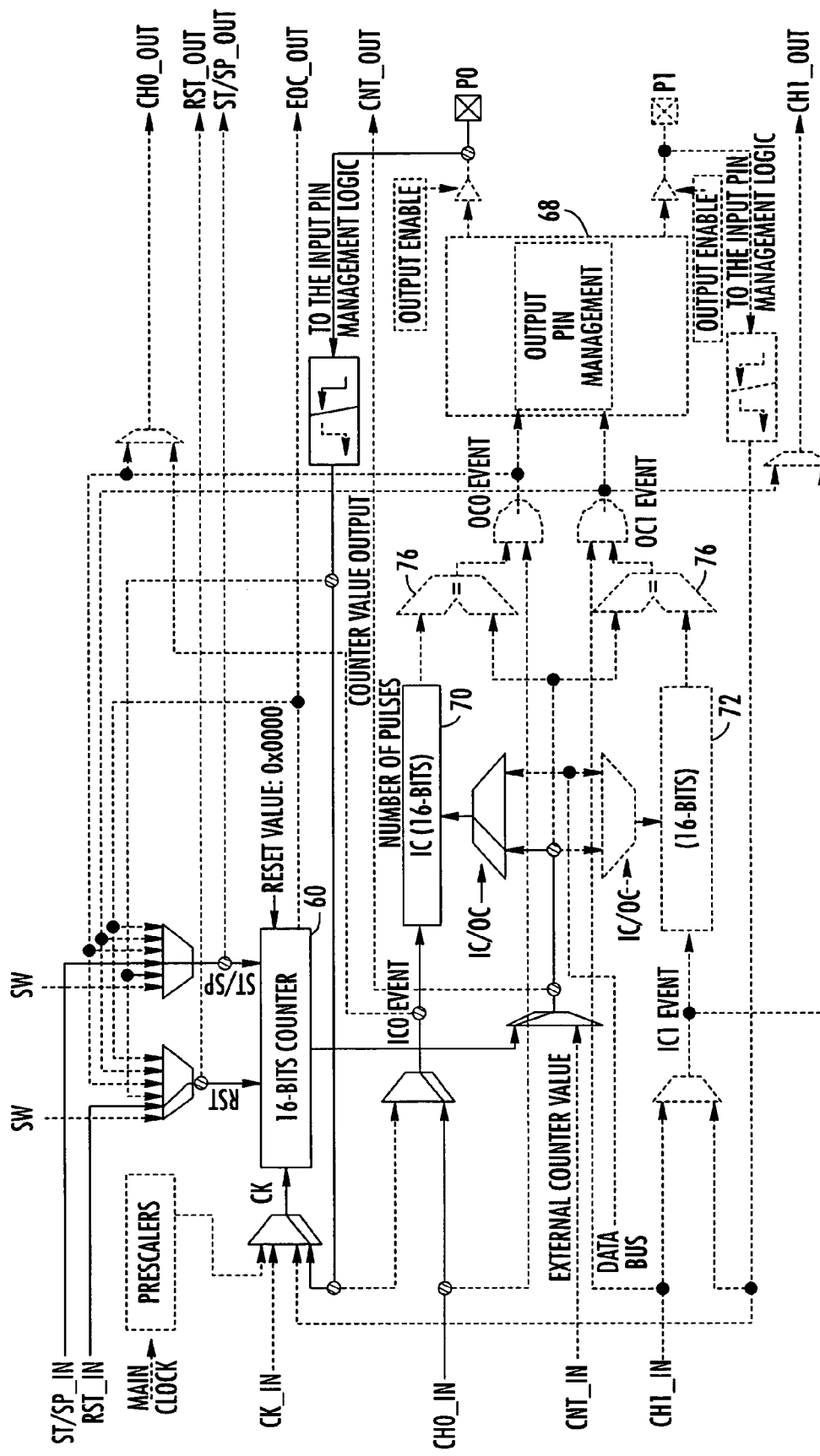

Another way of connecting two 16 bit timing units for realizing a CTS functioning as a continuous pulse accumulator is illustrated in FIGS. 9–11. The first timing unit TIME BASE GENERATOR generates one pulse over a pre-established number, stored in a capture and compare register 70, of pulses of the prescaled clock. The second timing unit PULSE COUNTER counts the input events (rising edges in the example) on one input/output pin (P0) and captures the number of counted events when the first timing unit asserts the signal CH0_OUT. The unused inputs and outputs are represented with dashed lines, while the used signals are represented with solid lines. In this case, the input/output pin P0 of the second timing unit PULSE COUNTER is used as input pin of the signal whose trailing edges must be counted. The timing unit of FIG. 4 may be used for many applications. The schemes of connections are not described in detail but may be appreciated by the skilled artisan.

Figure 12:
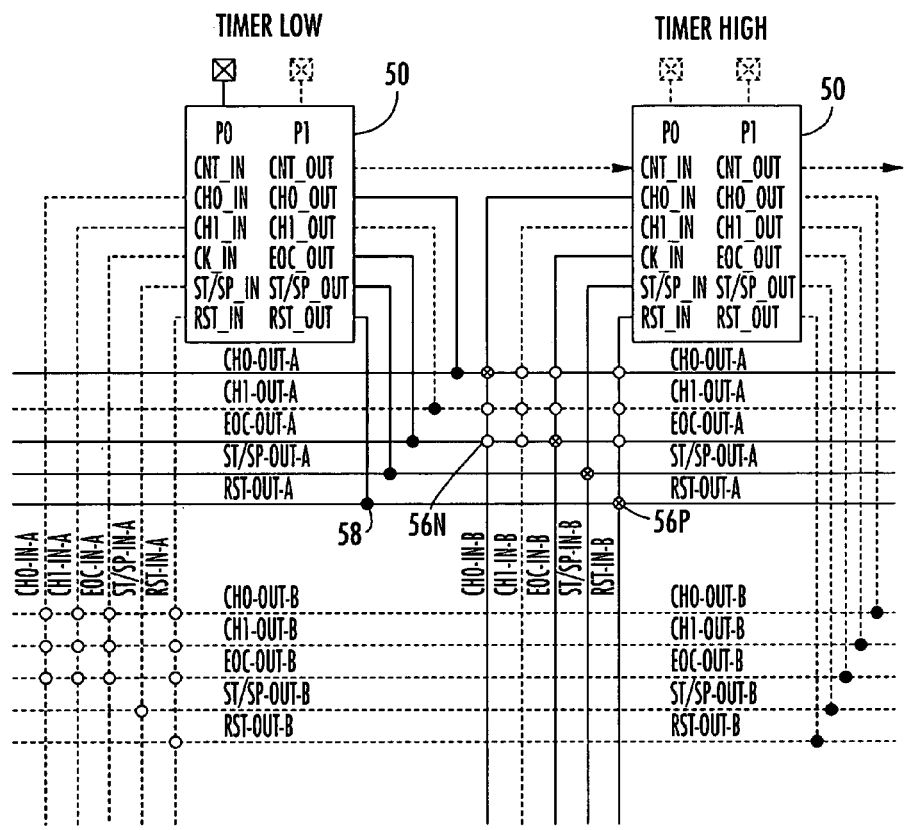
FIG. 12 is a schematic diagram illustrating the interconnections of two timing units of FIG. 4 of a configurable timing system of the invention for performing a frequency measurement of a PWM signal.
Figure 13:
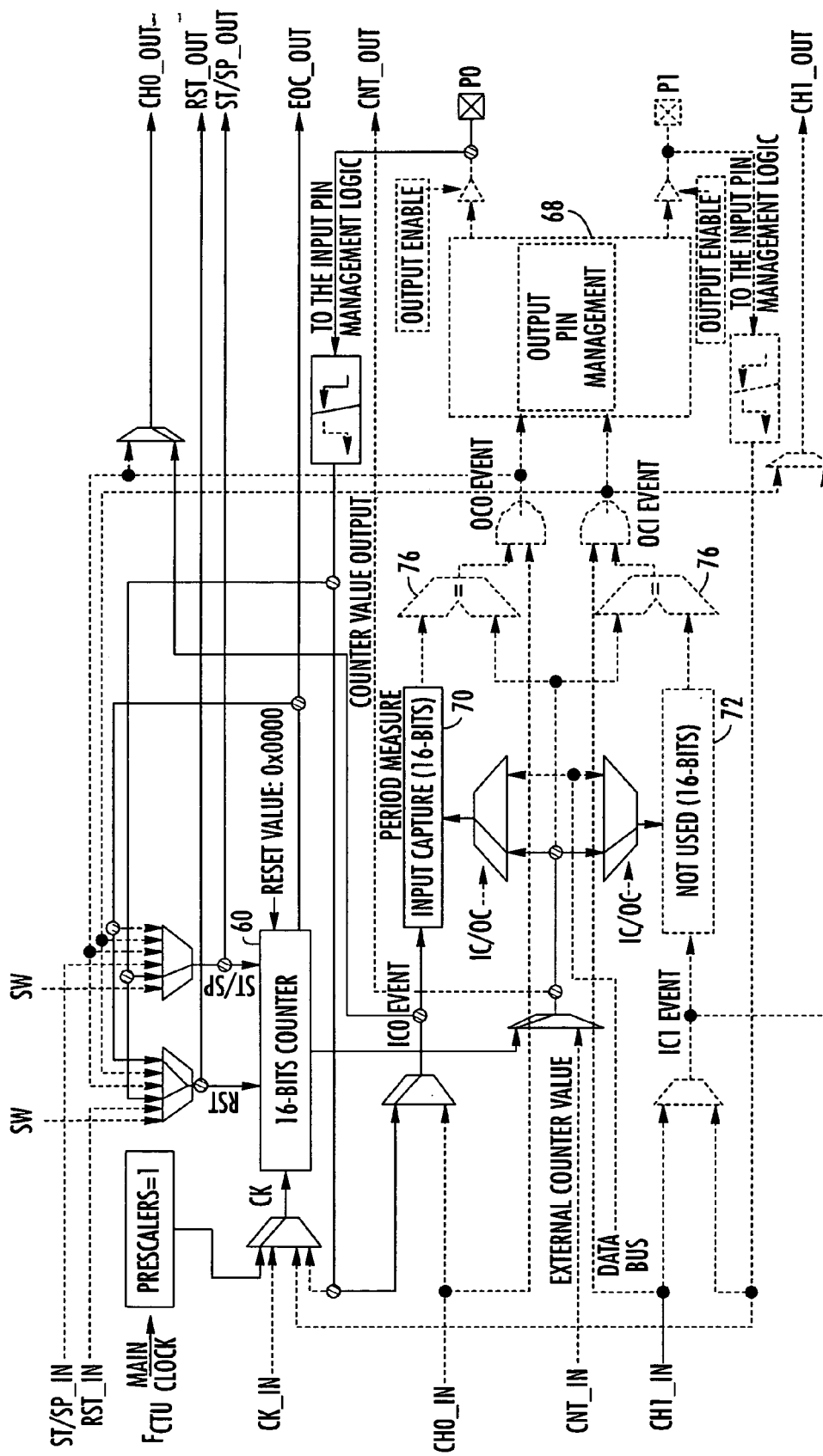
FIGS. 13 and 14 are schematic diagrams illustrating in detail the circuit blocks effectively used of the timing units FIG. 12.
Figure 14:
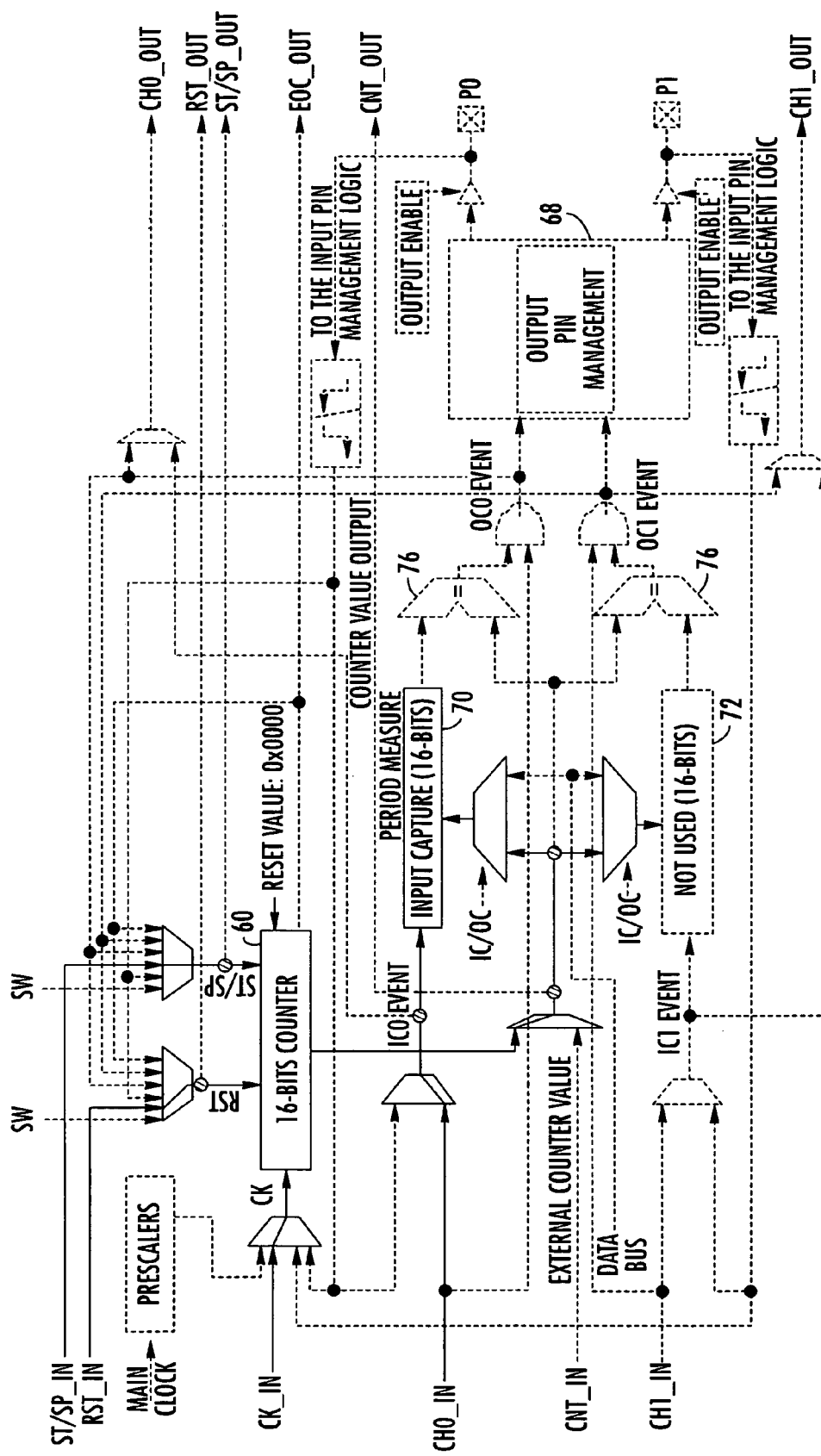
Figure 15:
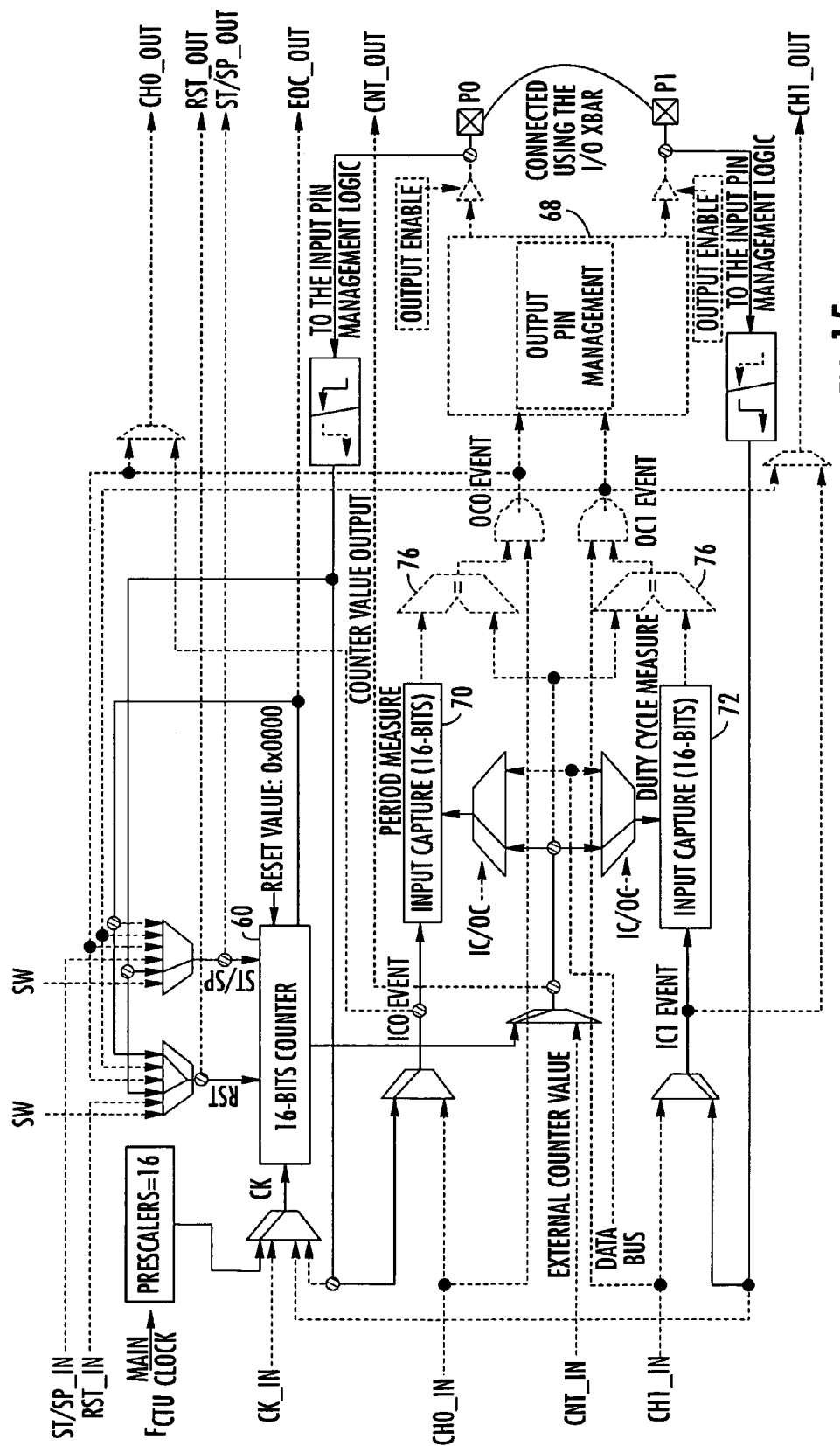
FIG. 15 is a schematic diagram illustrating in detail the circuit blocks effectively used of the timing unit of FIG. 4 when performing 16 bit duty cycle/period measurement of a PWM input signal.
Figure 16:
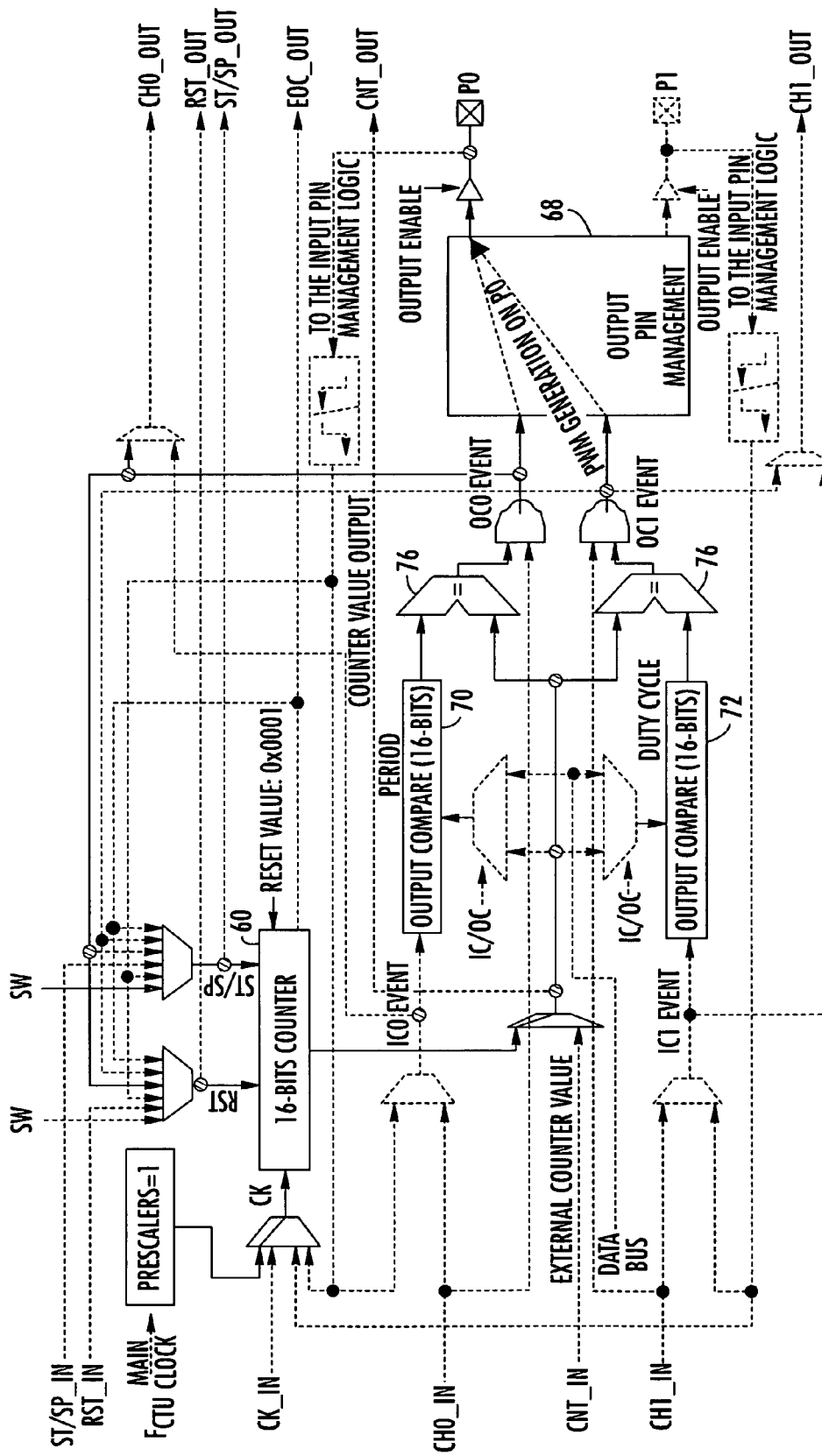
FIG. 16 is a schematic diagram illustrating in detail the circuit blocks effectively used of the timing unit of FIG. 4 when operating as a very high speed PWM modulator.

A detail of a configurable timing system for performing a frequency measurement of a PWM signal is illustrated in FIG. 12. The circuit blocks of the timing units effectively used are illustrated in FIGS. 13 and 14 with solid lines. FIG. 15 illustrates in detail the circuit blocks effectively used of the timing unit of FIG. 4 when performing 16 bit duty cycle/period measurement of a PWM input signal. FIG. 16 illustrates in detail the circuit blocks effectively used of the timing unit of FIG. 4 when operating as a very high speed PWM modulator. It should be noted the block PRESCALERS does not perform any division (PRESCALERS=1) of the high frequency system clock to generate the local clock signal of the timing unit.

Figure 17:
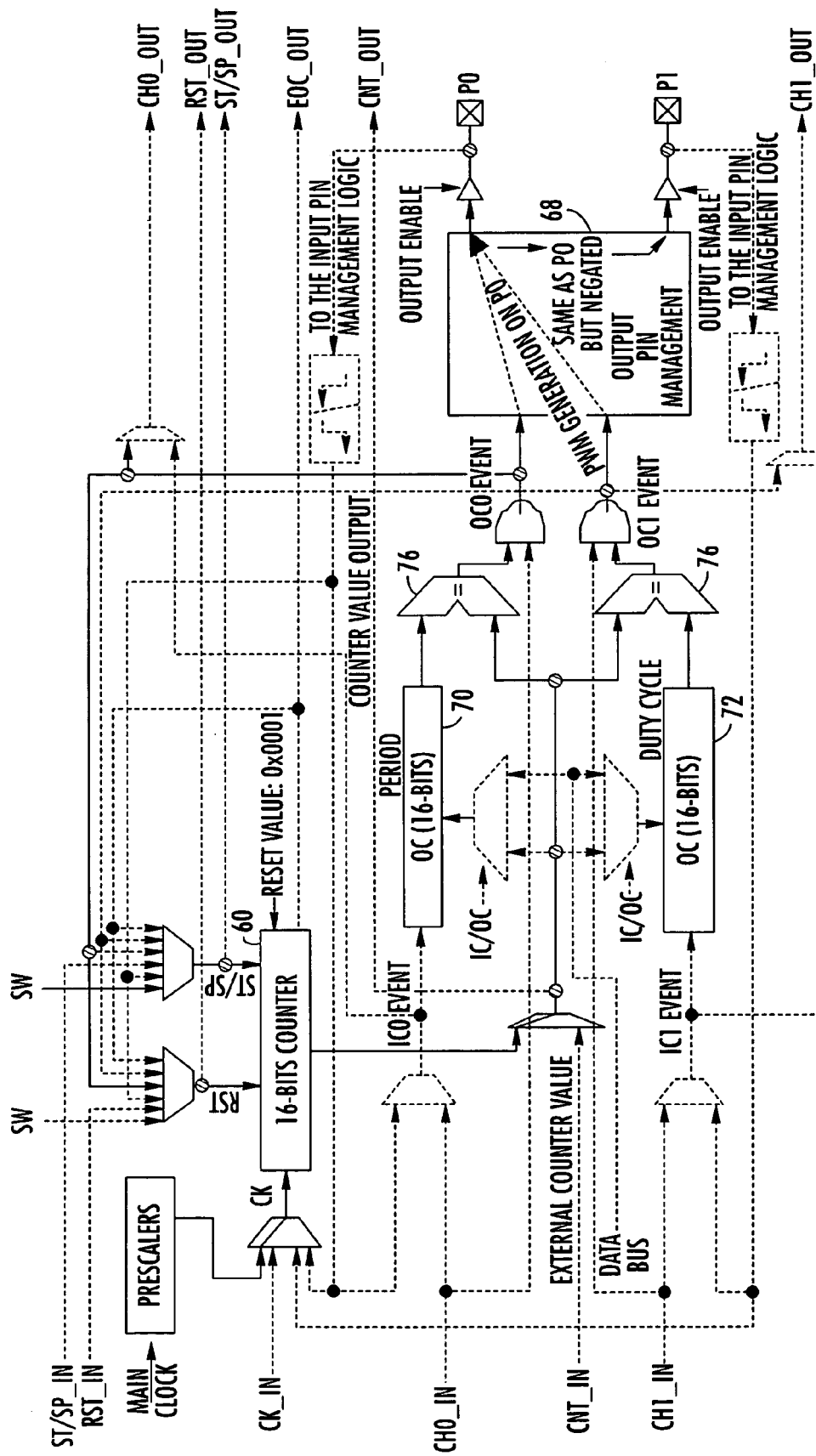
FIG. 17 is a schematic diagram illustrating in detail the circuit blocks effectively used of the timing unit of FIG. 4 when operating as a 16-bit PWM modulator generating two PWM signals outphased of 180°.
Figure 18:
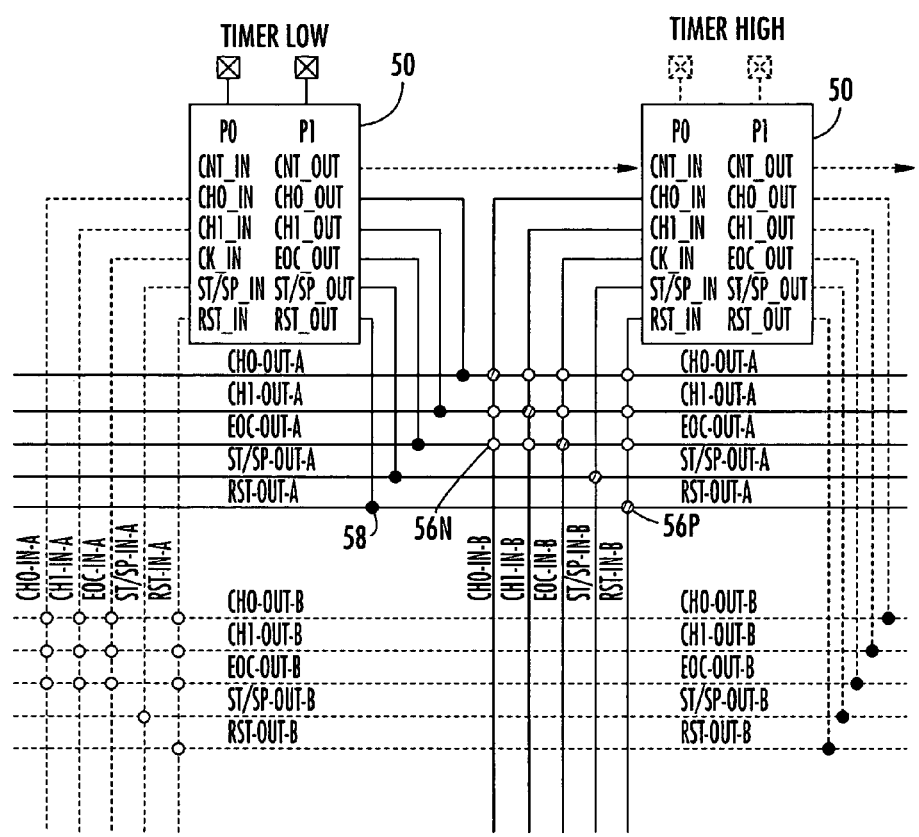
FIG. 18 is a schematic diagram illustrating the interconnections of two timing units of FIG. 4 of a configurable timing system of the invention for performing 32 bit duty cycle/period measurements of a PWM signal.
Figure 19:
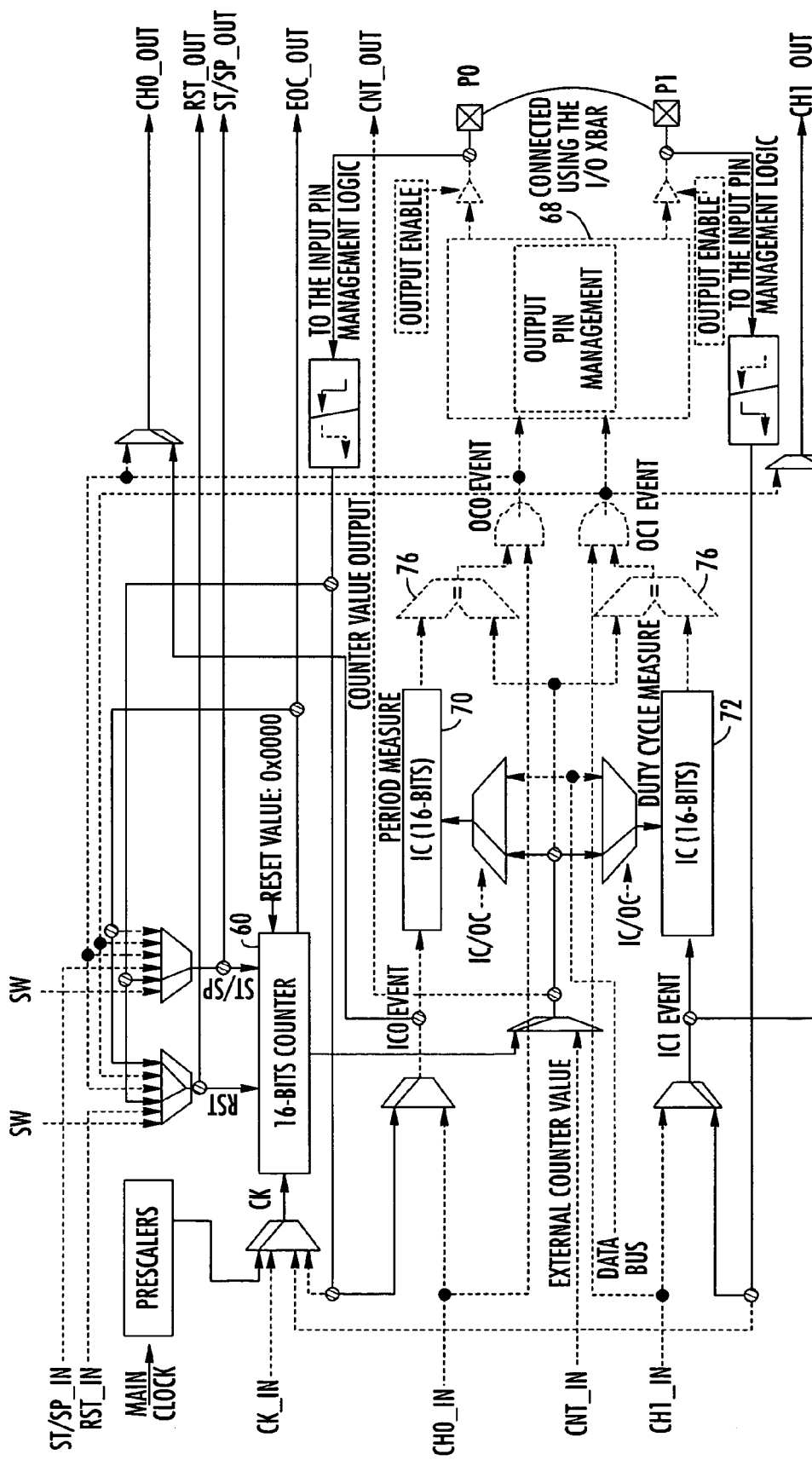
FIGS. 19 and 20 are schematic diagrams illustrating in detail the circuit blocks effectively used of the timing units of FIG. 18.
Figure 20:
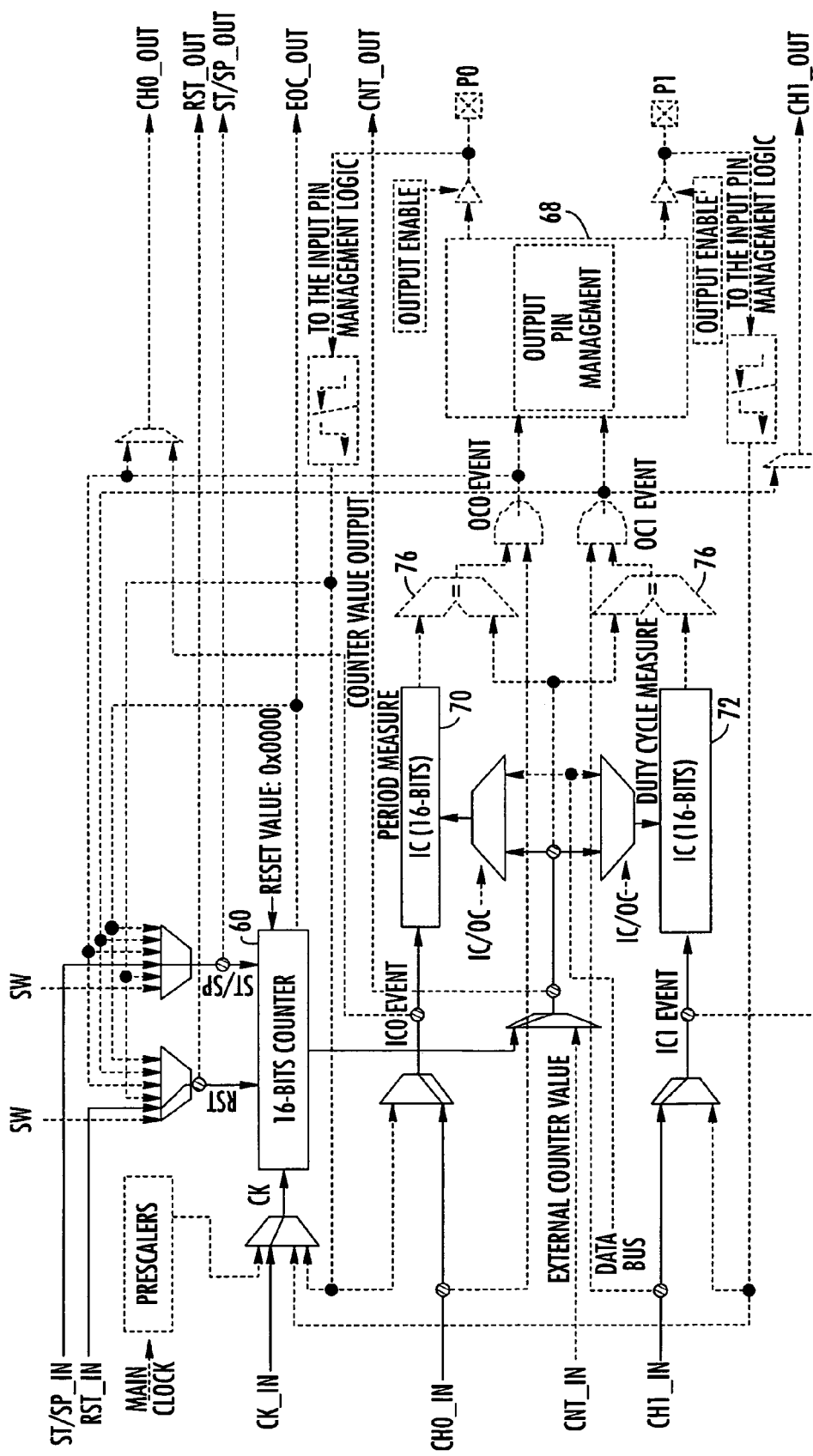

FIG. 17 illustrates in detail the circuit blocks effectively used of the timing unit of FIG. 4 when operating as a 16-bit PWM modulator generating two PWM signals outphased of 180° on the input/output pins P0 and P1. Detail of a configurable timing system of the invention for performing 32 bit duty cycle/period measurements of a PWM signal illustrated in FIG. 18. The circuit blocks of the timing units effectively used are illustrated in FIGS. 19 and 20.

Figure 21:
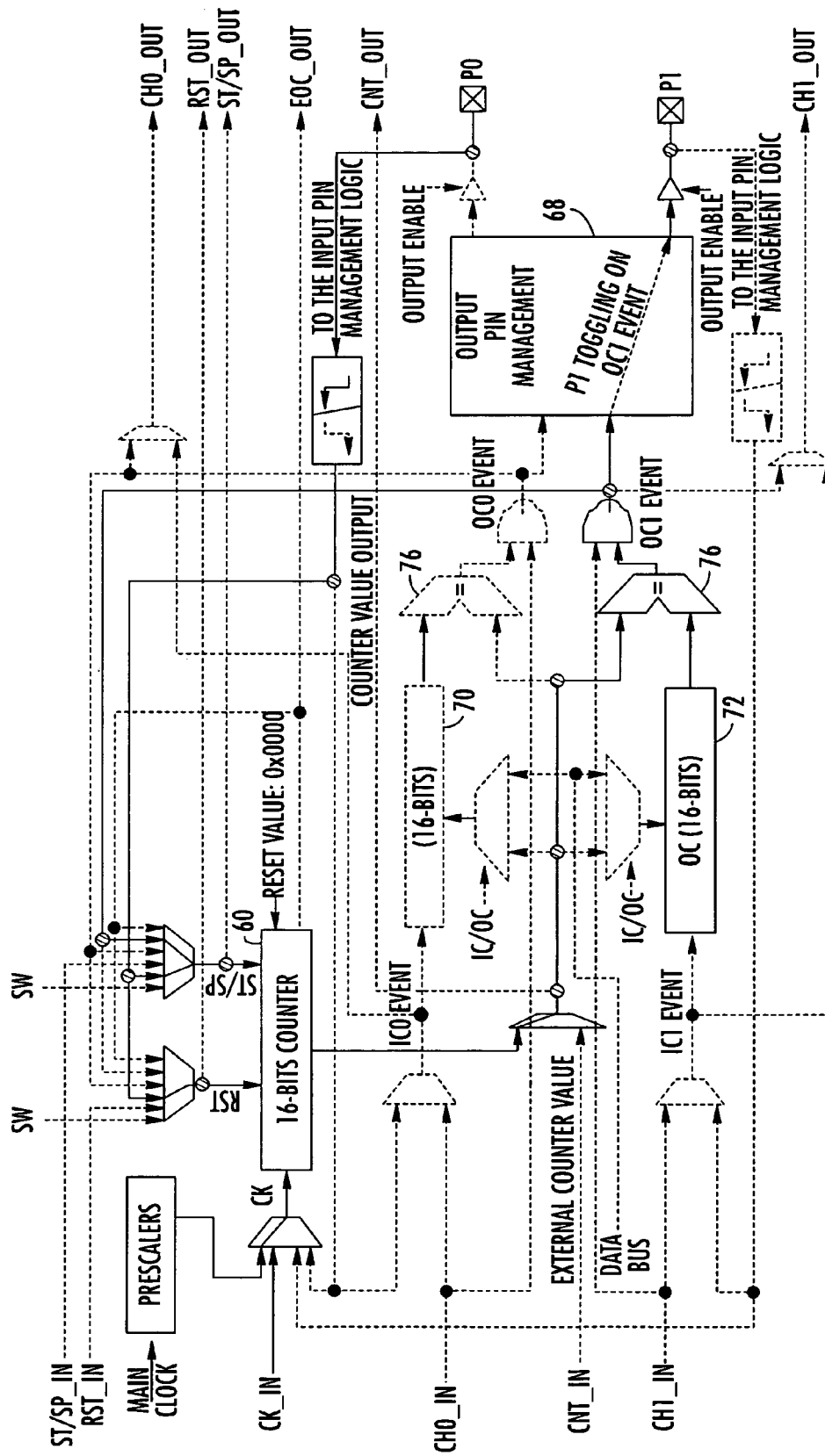
FIG. 21 is a schematic diagram illustrating in detail the circuit blocks effectively used of the timing unit of FIG. 4 of a configurable timing system of the invention for generating a digital signal whose trailing edge is delayed of a certain time from the trailing edge of a digital input signal.
Figure 22:
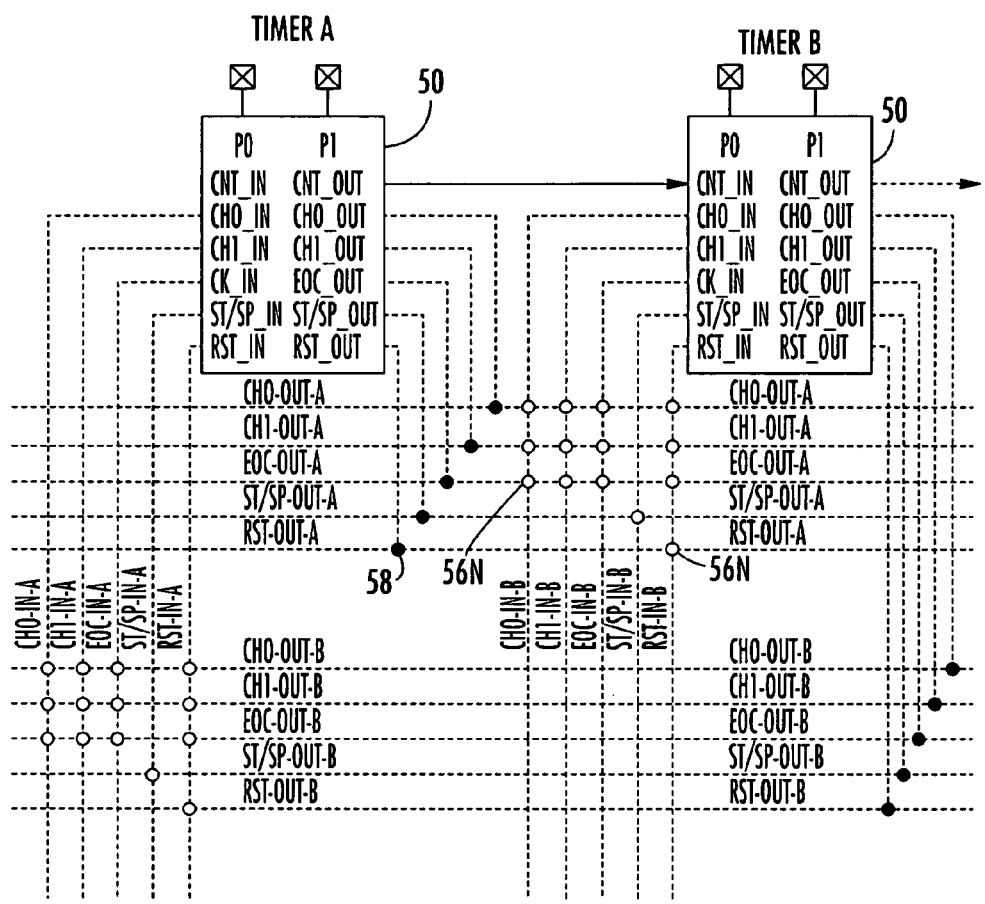
FIG. 22 is a schematic diagram illustrating the interconnections of two timing units of FIG. 4 of a configurable timing system of the invention for storing the instant of detection of a trailing or a falling edge of four digital signals.
Figure 23:
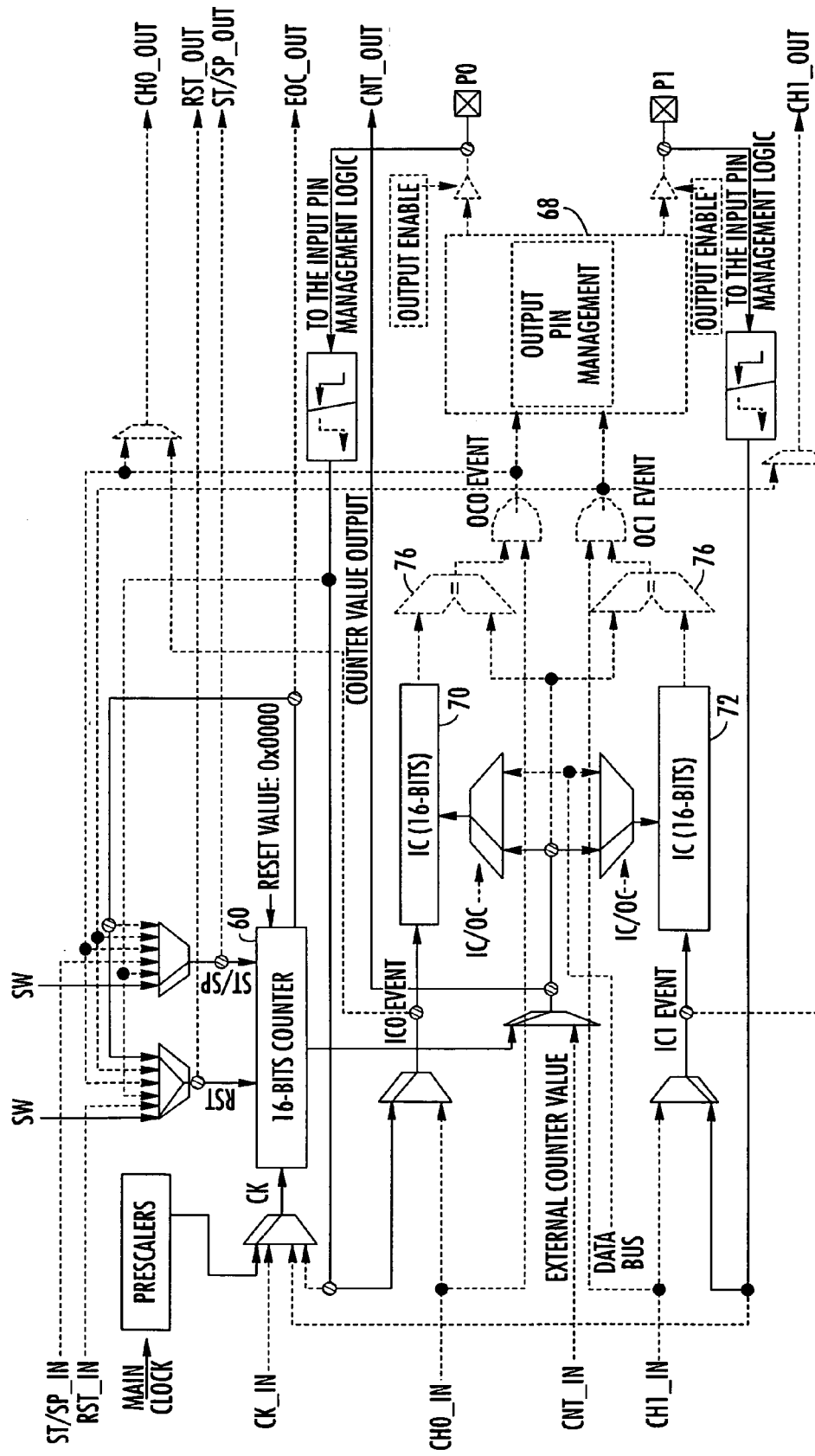
FIGS. 23 and 24 are schematic diagrams illustrating in detail the circuit blocks effectively used of the timing units of FIG. 22.
Figure 24:
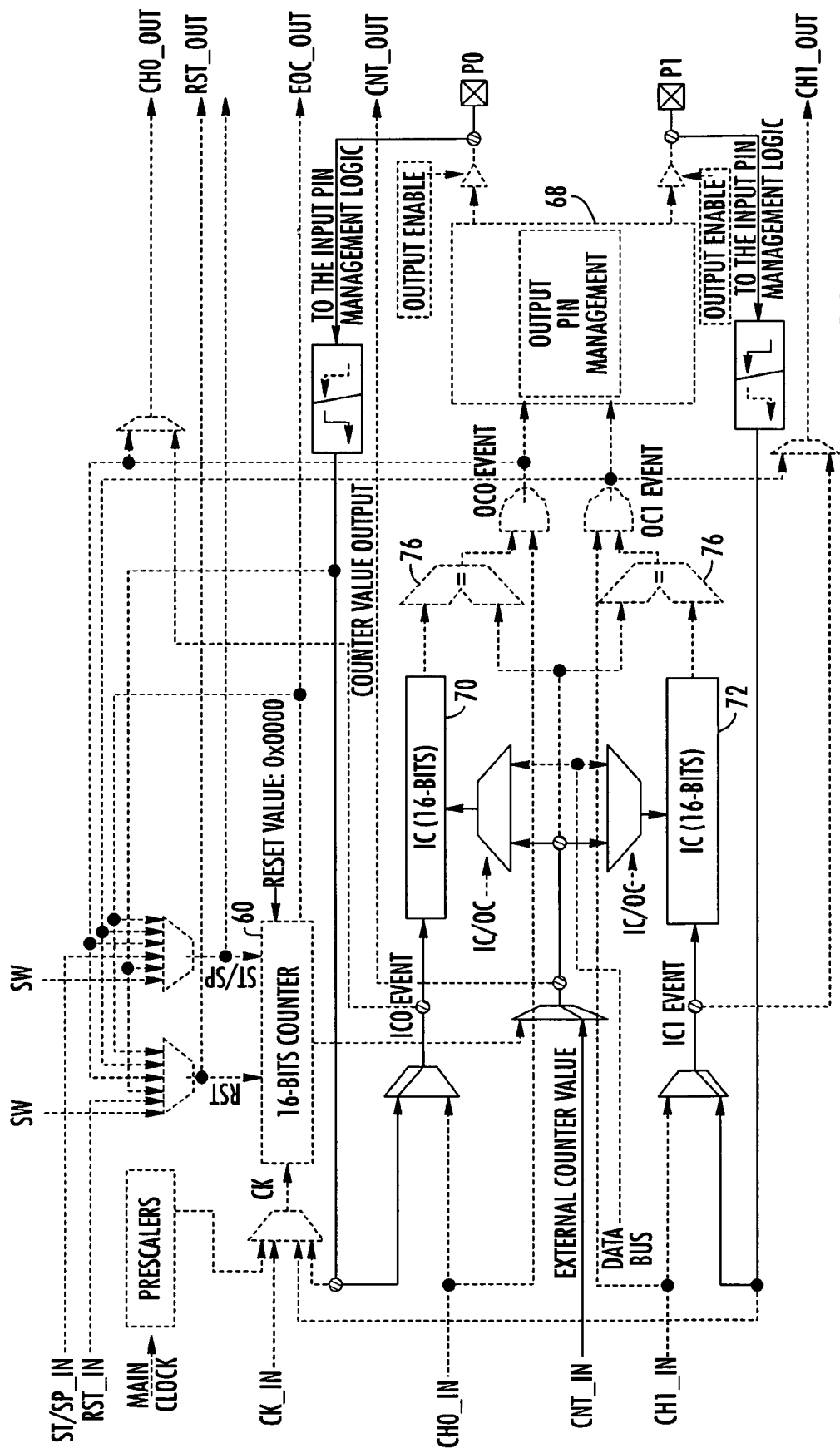

FIG. 21 illustrates in detail the circuit blocks effectively used of the timing unit of FIG. 4 of a configurable timing system of the invention for generating a digital signal whose trailing edge is delayed of a certain time from the trailing edge of a digital input signal on the pin P0. Detail of a configurable timing system of the invention for storing the instant of detection of a trailing or a falling edge of four digital signals is depicted in FIG. 22. The circuit blocks of the timing units effectively used are illustrated in FIGS. 23 and 24.

Figure 25:
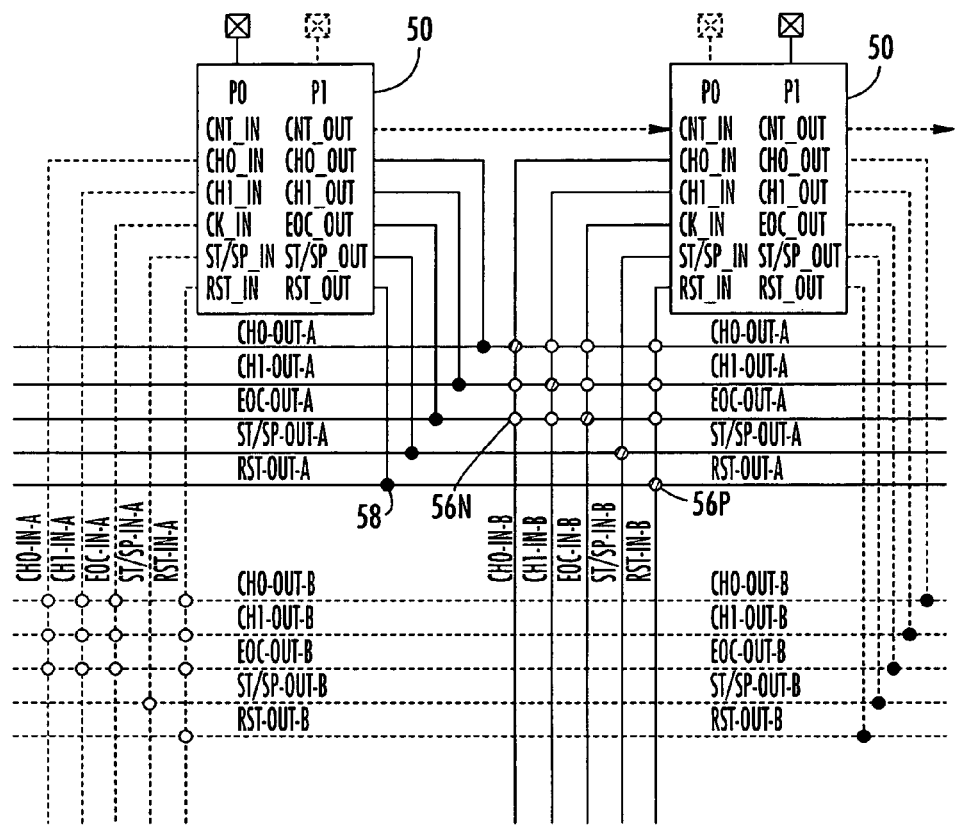
FIG. 25 is a schematic diagram illustrating the interconnections of two timing units of FIG. 4 of a configurable timing system of the invention for 32 bit storing the instant of detection of a falling edge of an input digital signal and generating a pulse when the number of counted pulses is equal to a 32 bit number.
Figure 26:
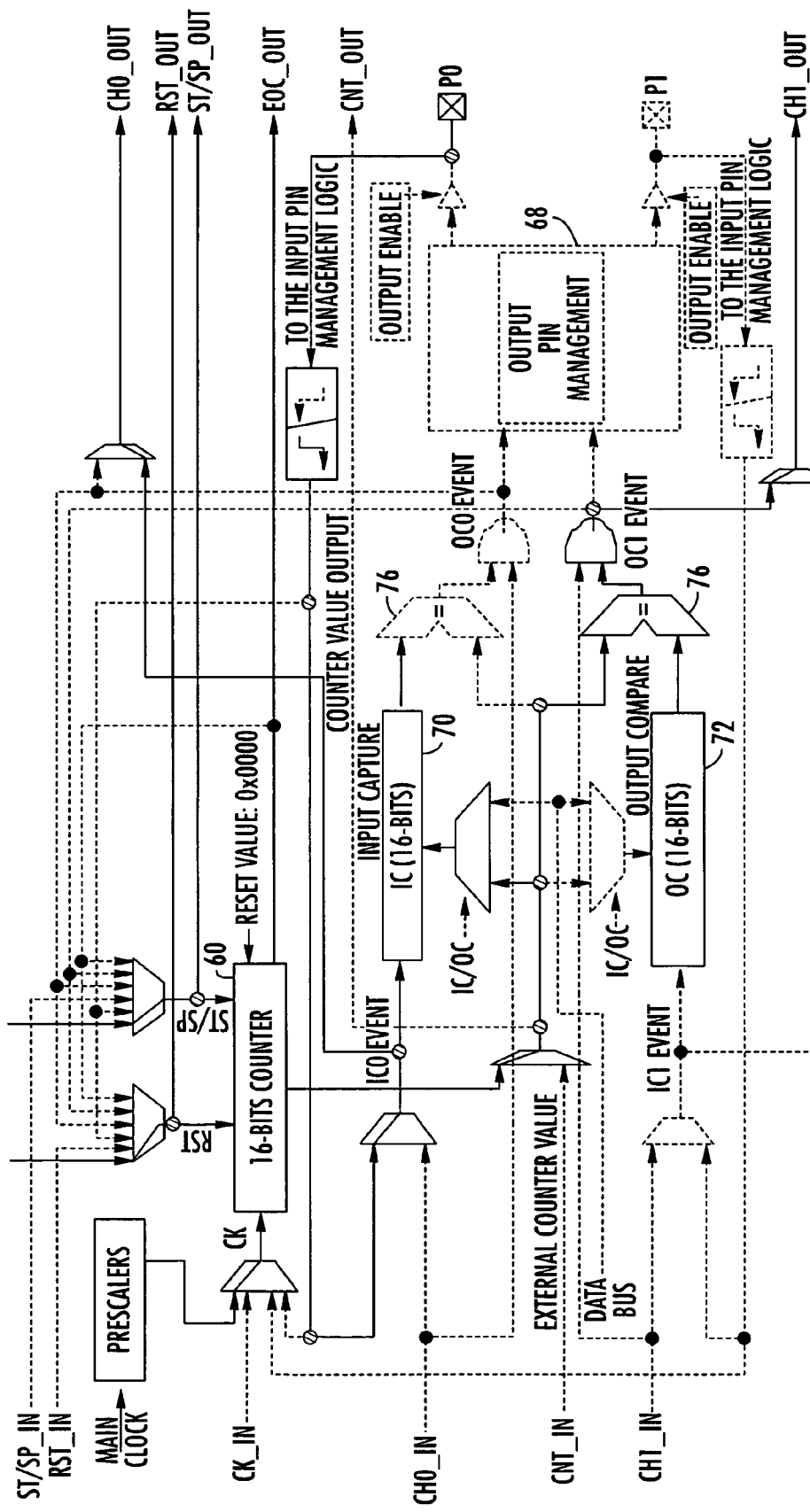
FIGS. 26 and 27 are schematic diagrams illustrating in detail the circuit blocks effectively used of the timing units of FIG. 25.
Figure 27:
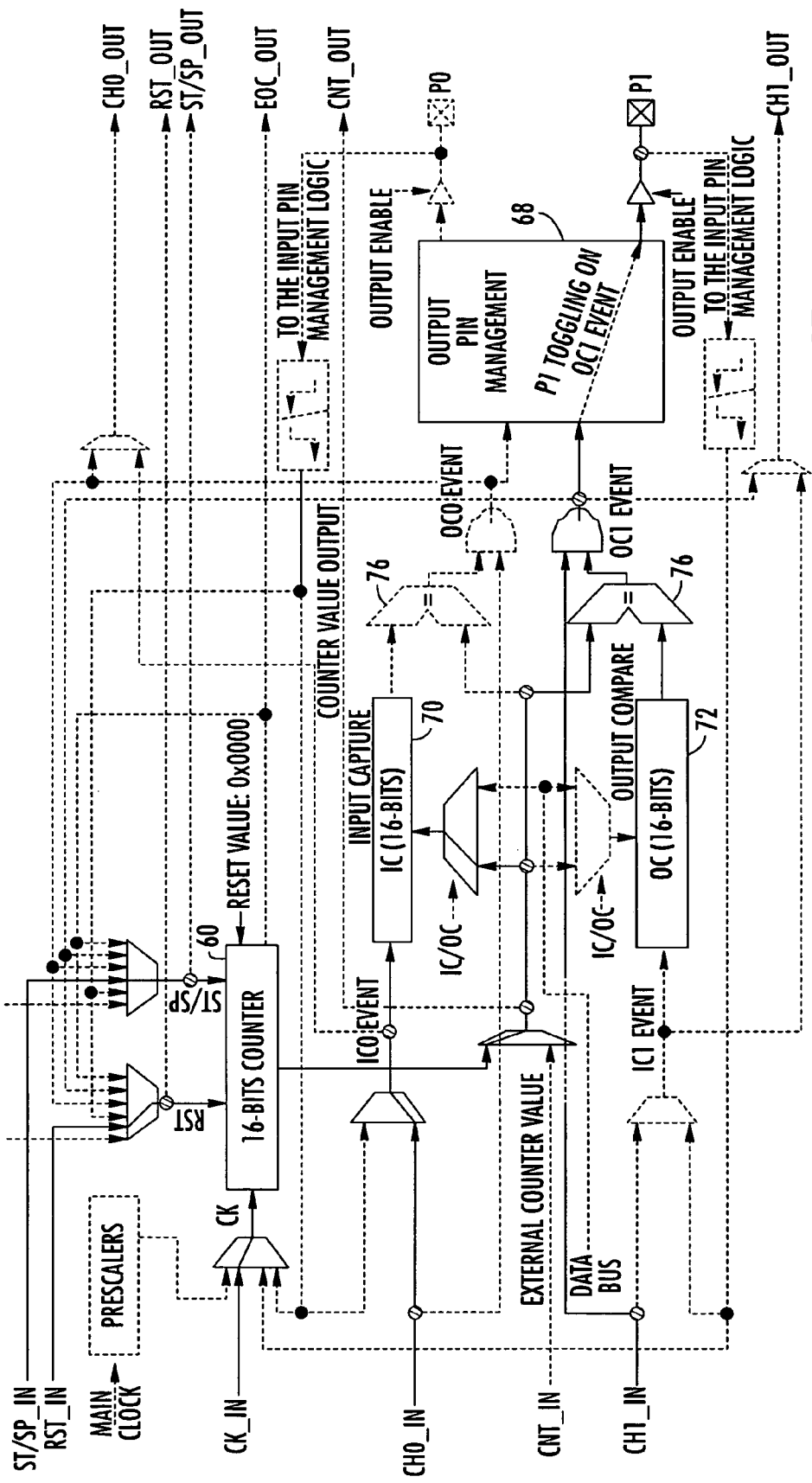
Figure 28:
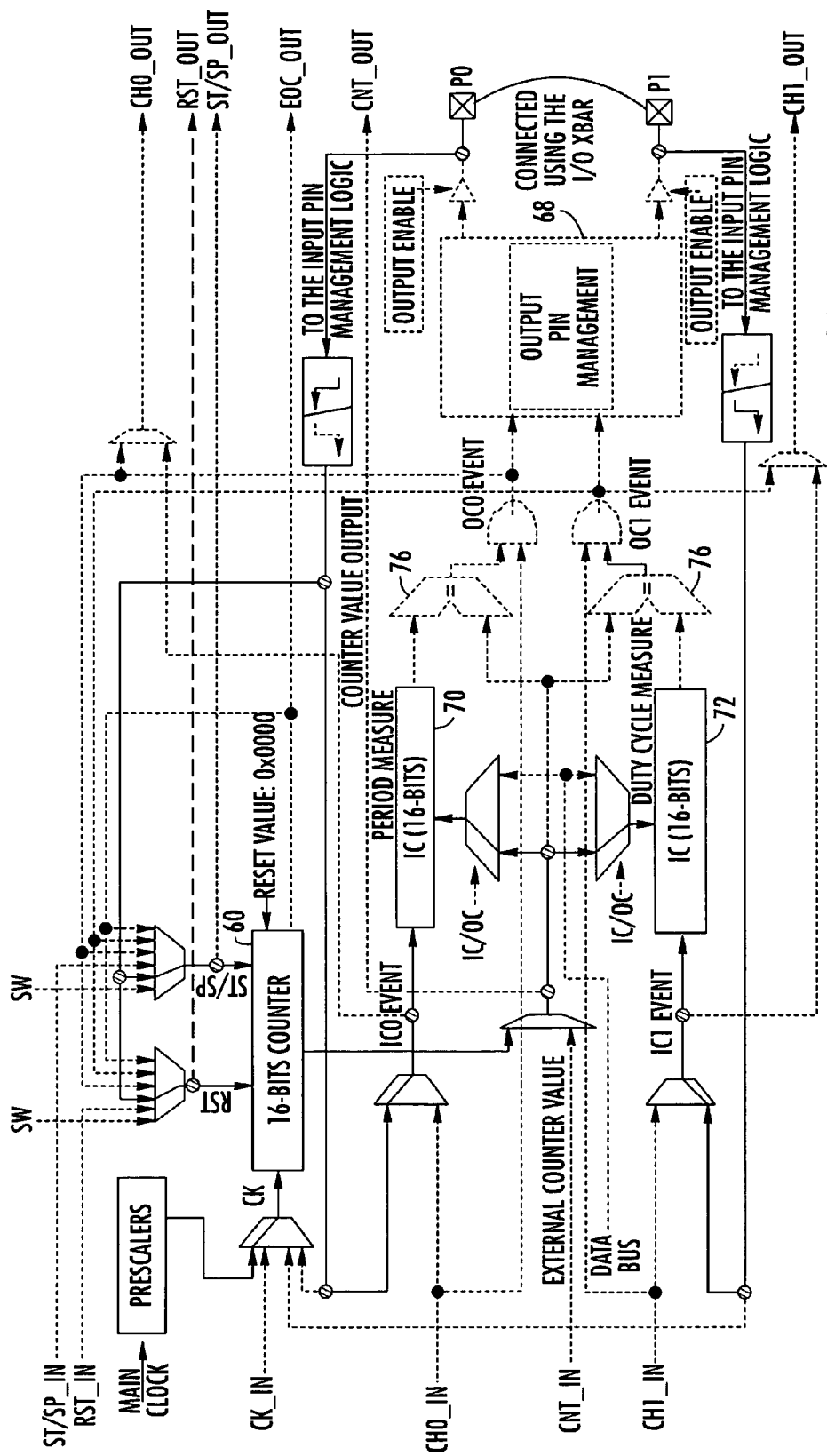
FIG. 28 is a schematic diagram illustrating in detail the circuit blocks effectively used of the timing unit of FIG. 4 when performing 16 bit duty cycle/period measurements of a PWM signal.

A configurable timing system of the invention for 32 bit storing the instant of detection of a falling edge of an input digital signal and generating a pulse when the number of counted pulses is equal to a 32 bit number is illustrated in FIG. 25. The circuit blocks of the timing units effectively used are illustrated in FIGS. 26 and 27. FIG. 28 illustrates a configurable timing system of the invention for performing 16 bit duty cycle/period measurements of a PWM signal.

That which is claimed is:

1. A timing system comprising:
   a plurality of timing units to perform a count operation;
   software programmable registers interconnecting the plurality of timing units; and
   a control circuit generating at least one clock signal for the plurality of timing units, the control circuit including an interface for connection to an external bus to receive and transmit data.

2. The timing system of claim 1, wherein each of the timing units has a plurality of inputs and a plurality of outputs; and further comprising:
   a first plurality of connection lines connected to each timing unit, and including connection lines for each input of the respective timing unit to which they are connected; and
   a second plurality of connection lines connected to each timing unit, and including connection lines for each output of the respective timing unit to which they are connected;
   the software programmable registers connecting the connection lines of the first and second pluralities of connection lines, respectively, to interconnect the timing units.

3. The timing system of claim 2, wherein the connection lines are hardwired to the respective inputs and outputs of the timing units.

4. The timing system of claim 1, wherein the plurality of timing units comprises more than two timing units.

5. The timing system of claim 1, wherein each timing unit generates digital output signals, and receives comparison values from the external bus, and each timing unit comprises:
   at least one input/output pin;
   a counter;
   a first circuit to generate pulses to be counted by the counter;
   a second circuit to generate start, stop and reset commands for the counter;
   a third circuit connected to the counter to generate the digital output signal, the third circuit comprising at least one capture and compare register to store the comparison values, a fourth circuit to generate an enabling signal for loading values in the capture and compare register, at least one comparator to compare the stored comparison value of the at least one capture and compare register with at least one of a count value of the counter and an external count value, and generate a comparison signal, and a logic circuit to generate output digital signals from the comparison signal; and an output stage to receive the digital output signal and output it on the at least one input/output pin.

6. The timing system of claim 5, wherein the at least one capture and compare register comprises a pair of capture and compare registers; wherein the at least one comparator comprises a pair of comparators each comparing the stored comparison value of a respective capture and compare register with at least one of the count value of the counter and the external count value to generate a first and second comparison signals, respectively; each timing unit further comprising first and second input capture pins for receiving capture signals that enable respective capture and compare registers to load comparison values; wherein said logic circuit comprises an output pin management unit to set, reset and toggle the at least one input/output pin based upon the comparison signals, and a pair of first and second logic gates each receiving respective comparison signals and respective capture signals, outputs of the first and second logic gates being input to the output pin management unit; and each timing unit further comprising a count pulse input, a start/stop count input, a reset input, a pair of compare outputs respectively connected to the output of the first and second logic gates, an end count output, a counter value output, a reset output, and a start/stop count output.

7. The timing system of claim 6, wherein the plurality of timing units comprises a first 16 bit timing unit defining a timer low unit, and a second 16 bit timing unit defining a timer high unit for generating a 32 bit PWM signal; wherein the end count output of the first timing unit is connected to the clock input of the second timing unit, the start/stop input of the second timing unit is connected to the start/stop output of the first timing unit, the reset input of the first timing unit is connected to the reset output of the second timing unit, and the compare outputs of the first timing unit are connected to respective capture inputs of the second timing unit.

8. The timing system of claim 6, wherein the plurality of timing units comprises a first 16 bit timing unit defining a time base generator, and a second 16 bit timing unit defining a pulse counter counting clock pulses with a certain sampling period, together defining a 32 bit continuous pulse accumulator; wherein the start/stop input of the second timing unit is connected to the start/stop output of the first timing unit, the reset input of the second timing unit is connected to the reset output of the first timing unit, and the compare output of the first timing unit is connected to the capture input of the second timing unit, a digital input signal being applied on the at least one input/output pin of the second timing unit.

9. The timing system of claim 6 wherein the plurality of timing units comprises a first 16 bit timing unit defining a timer low unit, and a second 16 bit timing unit defining a timer high unit, together performing a frequency measurement of a PWM input signal, and generating bits representing the frequency of the PWM input signal; wherein the end count output of the first timing unit is connected to the clock input of the second timing unit, the start/stop input of the second timing unit is connected to the start/stop output of the first timing unit, the reset input of the second timing unit is connected to the reset output of the first timing unit, and the first compare output of the first timing unit is connected to the respective capture input of the second timing unit, and the PWM input signal is received on the at least one input/output pin of the first timing unit.

10. The timing system of claim 6 wherein the at least one input/output pin comprises a pair of input/output pins; each timing unit further comprising first and second edge selection circuits connected to a respective input/output pin, generating pulses on at least one of trailing and falling edges of the digital output signal present on the respective input/output pin, an output of first edge selection circuit being connected to the first circuit; wherein the plurality of timing units comprises a first 16 bit timing unit defining a timer low unit, and a second 16 bit timing unit defining a timer high unit, together performing a 32 bit duty cycle/period measurement of a PWM input signal; wherein the end count output of the first timing unit is connected to the clock input of the second timing unit, the start/stop input of the second timing unit is connected to the start/stop output of the first timing unit, the reset input of the second timing unit is connected to the reset output of the first timing unit, and the compare outputs of the first timing unit are connected to the respective capture inputs of the second timing unit, the PWM input signal is received on both input/output pins of the first timing unit, and the first and second edge selection circuits generate a pulse corresponding to the trailing and the falling edge, respectively, of the PWM input signal.

11. The timing system (CTS) of claim 6 wherein the at least one input/output pin comprises a pair of input/output pins; each timing unit further comprising first and second edge selection circuits connected to a respective input/output pin, generating pulses on at least one of trailing and falling edges of the digital output signal present on the respective input/output pin, an output of first edge selection circuit being connected to the first circuit; wherein the plurality of timing units comprises a first 16 bit timing unit, and a second 16 bit timing unit, together storing an instant of detection of the trailing or falling edge of four input digital signals received on the input/output; wherein the capture and compare registers of the timing units store a value corresponding to a time elapsed from the start command being asserted, to detection of the trailing or falling edge of a corresponding input digital signal, each edge selection circuit generating a pulse corresponding to the trailing or the falling edge of the respective input digital signal.

12. The timing system of claim 6 wherein the at least one input/output pin comprises first and second input/output pins: each timing unit further comprising first and second edge selection circuits connected to a respective input/output pin, generating pulses on at least one of trailing and falling edges of the digital output signal present on the respective input/output pin, an output of first edge selection circuit being connected to the first circuit; wherein the plurality of timing units comprises a first 16 bit timing unit, and a second 16 bit timing unit, together 32 bit storing an instant of detection of a falling edge of an input digital signal received on first input/output pin of the first timing unit and generating a pulse when the number of counted pulses is equal to a 32 bit number; wherein the end count output of the first timing unit is connected to the clock input of the second timing unit, the start/stop input of the second timing unit is connected to the start/stop output of the first timing unit, the reset input of the second timing unit is connected to the reset output of the first timing unit, and the compare outputs of the first timing unit are connected to the respective capture inputs of the second timing unit, and the first edge selection circuit of the first timing unit generates a pulse corresponding to the falling edge of the input digital signal.

13. A timing unit interconnectable with other timing units to define a configurable timing system CTS) for generating digital output signals, and receiving comparison values from a data bus, the timing unit comprising:
   at least one input/output pin;
   a counter;
   a first circuit to generate pulses to be counted by the counter;
   a second circuit to generate start, stop and reset commands for the counter;
   a third circuit connected to the counter to generate the digital output signal, the third circuit comprising
      at least one capture and compare register to store the comparison values,
      a fourth circuit to generate an enabling signal for loading values in the capture and compare register,
      at least one comparator to compare the stored comparison value of the at least one capture and compare register with at least one of a count value of the counter and an external count value, and generate a comparison signal, and
      a logic circuit to generate output digital signals from the comparison signal; and
   an output stage to receive the digital output signal and output it on the at least one input/output pin.

14. The timing unit of claim 13, wherein the at least one capture and compare register comprises a pair of capture and compare registers; and wherein the at least one comparator comprises a pair of comparators each comparing the stored comparison value of a respective capture and compare register with at least one of the count value of the counter and the external count value to generate a first and second comparison signals, respectively.

15. The timing unit of claim 14, further comprising a count input; and wherein the capture and compare registers are coupled to the count input to receive the external count value from another timing unit.

16. The timing unit of claim 14, wherein the logic circuit comprises an output pin management unit to set, reset and toggle the at least one input/output pin based upon the comparison signals.

17. The timing unit of claim 14, further comprising first and second input capture pins for receiving capture signals that enable respective capture and compare registers to load comparison values.

18. The timing unit of claim 17, wherein said logic circuit comprises:
   an output-pin management unit to set, reset and toggle the at least one input/output pin based upon the comparison signals; and
   a pair of first and second logic gates each receiving respective comparison signals and respective capture signals, outputs of the first and second logic gates being input to the output pin management unit.

19. The timing unit of claim 18, further comprising:
   a count pulse input;
   a start/stop count input;
   a reset input;
   a pair of compare outputs respectively connected to the output of the first and second logic gates;
   an end count output;
   a counter value output;
   a reset output; and
   a start/stop count output.

20. The timing unit of claim 17, wherein the at least one input/output pin comprises first and second input/output pins; further comprising first and second edge selection circuits connected to a respective input/output pin, generating pulses on at least one of trailing and falling edges of the digital output signal present on the respective input/output pin, an output of first edge selection circuit being connected to the first circuit; and wherein the fourth circuit comprises a pair of multiplexers each coupled to the output of a respective edge selection circuit and to a respective input capture pin, generating the capture signals.

21. A timing unit of claim 20 for performing 16 bit duty cycle/period measurement of a PWM input signal received on the pair of input/output pins; wherein the first and second edge selection circuits generate a pulse corresponding. to at least one of the trailing and the falling edge, respectively, of the PWM input signal.

22. A timing unit of claim 20 for generating an output digital signal whose trailing edge is delayed a certain time from the trailing edge of an input digital signal received on the first input/output pin; wherein the first edge selection circuit generates a pulse corresponding to the trailing edge of the input digital signal, the second capture and compare register stores a number corresponding to the certain time, the second comparison signal is input to the output stage, and the output stage outputs the second comparison signal on the second input/output pin.

23. A timing unit of claim 20 for performing 16 bit duty cycle/period measurement of a PWM input signal received on the input/output pins; wherein the first and second edge selection circuits generate a pulse corresponding to trailing and falling edges of the PWM input signal.

24. A method of performing a timing function in a digital device, the method comprising:
   providing a plurality of timing units to perform a count operation;
   interconnecting the plurality of timing units with software programmable registers; and
   generating a clock signal for the plurality of timing units with a control circuit including an interface for connection to an external bus to receive and transmit data.

25. The method of claim 24, wherein each of the timing units has a plurality of inputs and a plurality of outputs; and further comprising:
   connecting a first plurality of connection lines to each timing unit, the first plurality of connection lines including connection lines for each input of the respective timing unit to which they are connected; and
   connecting a second plurality of connection lines connected to each timing unit, the second plurality of connection lines including connection lines for each output of the respective timing unit to which they are connected;
   the software programmable registers connecting the connection lines of the first and second pluralities of connection lines, respectively, to interconnect the timing units.

26. The method of claim 25, wherein the connection lines are hardwired to the respective inputs and outputs of the timing units.

27. The method of claim 24, wherein the plurality of timing units comprises more than two timing units.

28. The method of claim 24, wherein each timing unit generates digital output signals, and receives comparison values from the external bus, and each timing unit comprises;
   at least one input/output pin;
   a counter;
   a first circuit to generate pulses to be counted by the counter;

a second circuit to generate start, stop and reset commands for the counter;

a third circuit connected to the counter to generate the digital output signal, the third circuit comprising at least one capture and compare register to store the comparison values, a fourth circuit to generate an enabling signal for loading values in the capture and compare register, at least one comparator to compare the stored comparison value of the at least one capture and compare register with at least one of a count value of the counter and an external count value, and generate a comparison signal, and a logic circuit to generate output digital signals from the comparison signal; and an output stage to receive the digital output signal and output it on the at least one input/output pin.

* * * * *

UNITED STATES PATENT AND TRADEMARK OFFICE
CERTIFICATE OF CORRECTION

PATENT NO. : 7,024,579 B2  Page 1 of 1
APPLICATION NO. : 10/229377
DATED : April 4, 2006
INVENTOR(S) : Battaia It is certified that error appears in the above-identified patent and that said Letters Patent is hereby corrected as shown below:

Column 10, Lin 51    Delete: "pins:"
                     Insert -- pins; --

Column 11, Line 51   Delete: "output-pin"
                     Insert -- output pin --

Column 12, Line 15   Delete: "corresponding."
                     Insert -- corresponding --

Signed and Sealed this

Fourteenth Day of November, 2006

JON W. DUDAS
*Director of the United States Patent and Trademark Office*